United States Patent [19]
Deel

[11] Patent Number: 5,845,875
[45] Date of Patent: Dec. 8, 1998

[54] MODULAR LAUNCH PAD SYSTEM

[75] Inventor: Gary G. Deel, Santa Maria, Calif.

[73] Assignee: Lockheed Martin Corporation, Bethesda, Md.

[21] Appl. No.: 627,565

[22] Filed: Apr. 4, 1996

Related U.S. Application Data

[63] Continuation of Ser. No. 245,178, May 17, 1994, abandoned, which is a continuation-in-part of Ser. No. 236,298, May 2, 1994, abandoned.

[51] Int. Cl.$^6$ ............................... B64F 1/04; B64F 1/14; F41F 3/04
[52] U.S. Cl. .................. 244/63; 244/114 B; 244/115; 89/1.8; 89/1.806
[58] Field of Search .................. 244/63, 114 R, 244/114 B, 115; 89/1.8, 1.804, 1.806, 1.815

[56] References Cited

U.S. PATENT DOCUMENTS

| | | | |
|---|---|---|---|
| 3,122,057 | 2/1964 | Kubit | 244/63 |
| 3,228,294 | 1/1966 | Hickman | 89/1.8 |
| 3,691,714 | 9/1972 | Stepp | 52/424 |
| 3,767,153 | 10/1973 | Haller et al. | 244/18 |
| 3,785,097 | 1/1974 | Seymour | 52/122 |
| 3,879,914 | 4/1975 | Haller et al. | 52/745 |
| 4,291,629 | 9/1981 | Kezer | 102/334 |
| 4,332,116 | 6/1982 | Buchanan | 52/82 |
| 4,344,592 | 8/1982 | Constantinescu | 244/63 |
| 4,493,177 | 1/1985 | Grossman | 52/745 |
| 5,012,720 | 5/1991 | Tidman | 89/8 |
| 5,127,609 | 7/1992 | Lynn | 244/114 B |
| 5,194,688 | 3/1993 | Piesik | 89/1.8 |
| 5,337,567 | 8/1994 | Loving | 60/722 |

*Primary Examiner*—Virna Lissi Mojica
*Attorney, Agent, or Firm*—Holme Roberts & Owen

[57] ABSTRACT

A modular launch pad for a launch vehicle which comprises a frame and a plurality of building units separably connected to the frame by means of connectors. The building unit comprise a concrete slab and a peripheral frame made of U-shaped channel sections connected to one another to form a frame, wherein the legs of the U are directed inwardly to engage the major surfaces of the slab. At least one of the legs of the channel sections is partially embedded in the slab so that the outer surfaces of the legs lie flush with the portion of the major surface extending between the legs. A plurality of longitudinally and transversely extending reinforcement bars are embedded in the concrete slab and a plurality of connecting means are secured to the slab. The pad has a launch vehicle mount for supporting a launch vehicle and defines exhaust gas channels in flow communication with an exhaust gas opening in the mount. Deflectors serve to channel launch exhaust gases of the launch vehicle into the channels away from the vehicle.

17 Claims, 45 Drawing Sheets

MODULAR LAUNCH PAD SYSTEM

This application is a continuation of application Ser. No. 08/245,178, filed on May 17, 1994, now abandoned, which is a Continuation-In-Part application of Ser. No. 08/236,298, filed on May 2, 1994, now abandoned.

FIELD OF THE INVENTION

This invention relates generally to an apparatus for supporting launch vehicles, and more particularly to a modular launch pad.

BACKGROUND OF THE INVENTION

For many years, rockets have been used to launch payloads into space. Increasingly, uses of non-military satellites has expanded the opportunities for defense companies to develop non-military launch applications using formerly military launch technologies. This has created a need for systems suitable of launching satellites from sites throughout the world, including remote locations.

The exhaust gases from launch vehicles exit at high temperatures and pressures in excess of 1000 psi. To prevent destruction of the launch vehicle, the gases are vented away from the motor base through ducts positioned below the first stage motors. Because of the large gas volume and pressures, traditional launch pads have been permanent constructions made of reinforced concrete built in place in deep holes below ground surface, relying on the surrounding earth to provide lateral support to the duct walls. This type of construction requires the removal of substantial amounts of soil to prepare a suitable base. The resulting construction, which is made from concrete and steel, is thus a permanent structure.

In addition, each launch site was designed for a specific launch system and extensive retrofitting was required to adapt a launch pad for use with a larger or smaller launch motor.

OBJECTS AND SUMMARY OF THE INVENTION

It is an object of the present invention to provide a launch pad system which can be constructed from preconstructed modular units on the surface of the ground without any significant subsurface excavation.

It is another object of the present invention to provide a launch pad system which is easily assembled from preconstructed modules and which can be dismantled after use.

It is a further object of the invention to provide a modular launch pad system in which the modules are sized to allow easy transportation and handling using conventional flat bed trucks and cranes.

It is still a further object of this invention to provide a highly mobile launch support system which can be assembled from components which can be moved onto the construction site with conventional flatbed vehicles and assembled with conventional heavy lifting equipment.

It is another object of the present invention to provide a modular launch pad system which can be easily repaired.

It is another object of the present invention to provide a launch pad blast deflector for deflecting the exhaust gases of a launch vehicle during the launching thereof.

It is yet another object of the invention to provide a modular unit and connectors for connecting modular units to one another.

It is still another object of the invention to provide a launch vehicle mounting means which can be adjusted to accept a wide variety of launch vehicle sizes.

According to the invention there is a provided a launch pad for a launch vehicle, comprising a frame, a plurality of slab means separably connected to the frame by means of slab connectors; and a launch vehicle mounting means having an exhaust gas opening for supporting a launch vehicle, the launch pad defining exhaust gas channelling means in flow communication with the exhaust gas opening of the mounting means for channelling launch exhaust gases of the launch vehicle away from the vehicle.

Each slab means can include a reinforced concrete slab having opposed major surfaces, and connecting means embedded in the concrete slab complimentarily engageable with the slab connectors.

The slab means can include a peripheral frame secured to the periphery of the concrete slab.

The frame can comprise U-shaped channel sections connected to one another to form a frame, the legs of the U being directed inwardly to engage the major surfaces of the slab.

At least one of the legs of the channel sections can be partially embedded in the concrete slab to provide the slab means with at least one smooth major face.

Each connecting means can comprise an internally threaded sleeve extending into the slab from one of the major surfaces of the slab.

The sleeve can extend through the slab between the major surfaces of the slab. The ends of the sleeves can lie flush with the major surfaces of the slab.

Each connecting means can comprise an internally threaded sleeve extending into the frame through at least one of the legs of the U.

The launch pad can include a blast deflecting means for deflecting launch vehicle exhaust gases into the channelling means.

The blast deflecting means can comprise at least one angled deflector plate having a ramp-like concave surface.

The plate can be a steel plate coated with an insulating ceramic material on the concave surface.

The channelling means can comprise at least one laterally extending duct forming a flow path extending away from the blast deflecting means.

The channelling means can comprise two ducts extending outwardly in opposite directions from the blast deflecting means, and wherein the blast deflecting means can include a pair of angled deflector plates each having a ramp-like concave surface, the plates being connected along upper edges of the plates to form are vertex.

The launch vehicle mounting means can include a plurality of vertically extending pillars and on adapting means mounted on the pillars for supporting a launch vehicle.

The adapting means can comprise an adapter ring removably engagebly with upper ends of the pillars.

The adapting means can comprise a plurality of pedestals having horizontal upper faces, the pedestals being movably mounted relative to one another.

Further according to the invention there is provided a building unit comprising a concrete slab having opposed major surfaces; a plurality of longitudinally and transversely extending reinforcement bars embedded in the concrete slab; a plurality of internally threaded sleeves embedded in the slab, the sleeves extending into the slab from one of the major surfaces to define threaded channels in the slab.

The building unit can include a peripheral frame made of U-shaped channel sections connected to one another to form a frame, wherein the legs of the U are directed inwardly to engage the major surfaces of the slab, at least one of the legs of the channel sections being partially embedded in the slab so that the outer surfaces of said legs lie flush with the portion of the major surface extending between said legs.

The sleeves can extend through the slab between the major surfaces.

The sleeves can extend through at least one of the legs of the U-shaped channel sections and into the slab.

Still further according to the invention there is provided a building unit, comprising a concrete slab having opposed major surfaces; a peripheral frame made of U-shaped channel sections connected to one another to form a frame, wherein the legs of the U are directed inwardly to engage the major surfaces of the slab, at least one of the legs of the channel sections being partially embedded in the slab so that the outer surfaces of said legs lie flush with the portion of the major surface extending between said legs; a plurality of longitudinally and transversely extending reinforcement bars embedded in the concrete slab; and a plurality of connecting means secured to the slab or to a leg of the U-shaped channel sections.

The connecting means can comprise internally threaded sleeves embedded in the slab.

Still further according to the invention there is provided a vehicle exhaust gas deflector assembly comprising at least one angled deflector plate having a ramp-like concave surface.

The plate can be a steel plate coated with an insulating ceramic material on the concave surface.

The deflector assembly can include a pair of angled deflector plates each having a ramp-like concave surface, the plates being connected along upper edges of the plates to form a vertex.

Still further according to the invention there is provided a launch vehicle mounting means comprising a plurality of vertically mounted pillars and an adapting means mounted on the pillars for supporting a launch vehicle.

The adapting means can comprise an adaptor ring removably engageable with upper ends of the pillars.

The adapting means can instead comprise a plurality of pedestals having horizontal upper faces, the pedestals being movably mounted relative to one another. The adapting means can include a plurality of arms pivotally connected to a mounting frame and wherein the pedestals can be pivotally connected to the arms.

DETAILED DESCRIPTION OF THE DRAWINGS

Figure 1:
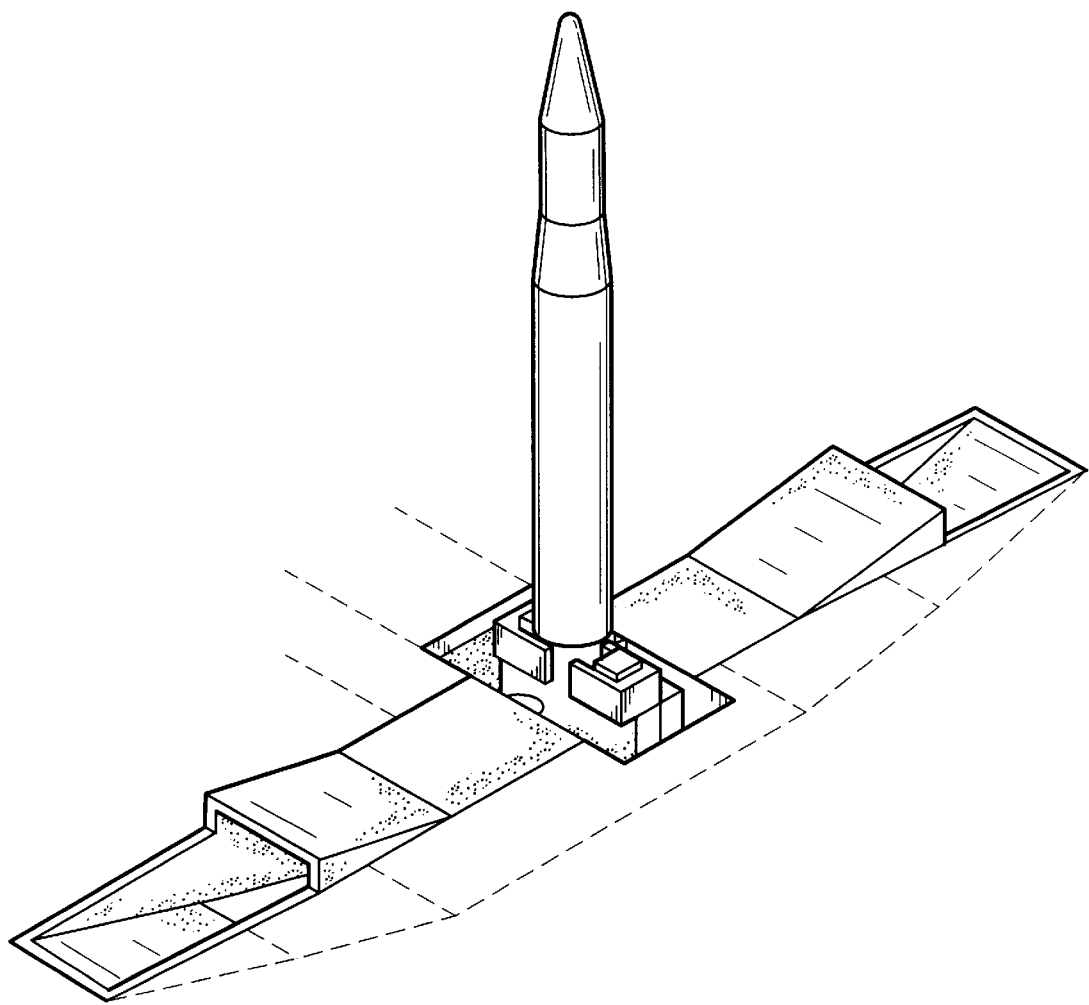
FIG. 1 is an isometric view of a prior art launch pad.

Launch pads have, to date, involved immovable concrete structures built into the ground as illustrated in FIG. 1. This invariably involves a great deal of excavation, typically of the order of 15 feet deep, requiring much preparation and resulting in a fixed structure. Generally, the launch pad is cast on site.

Figure 2:
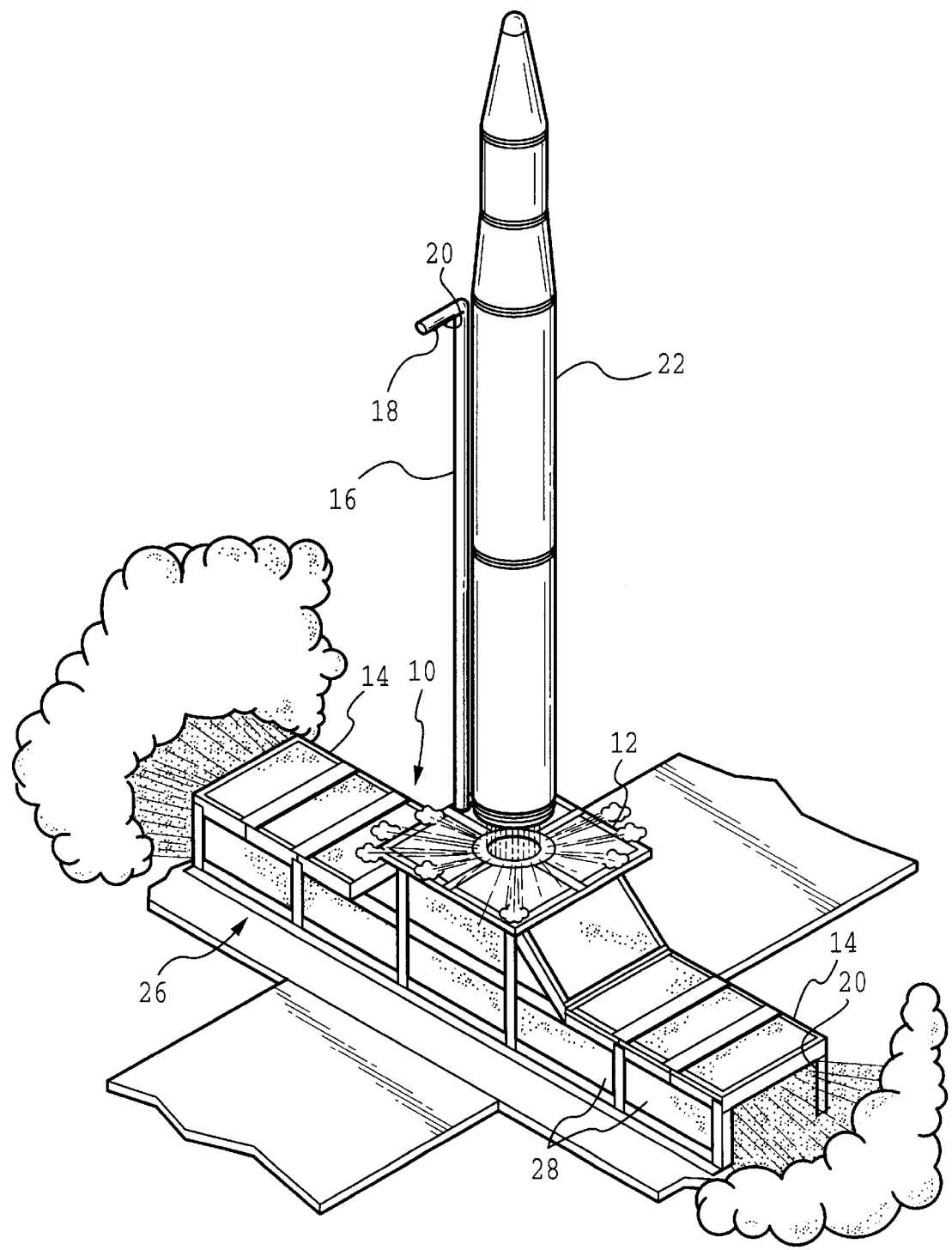
FIG. 2 is an isometric view of the preferred embodiment of a launch pad of the present invention.

In contrast the launch pad of the present invention is made up of a series of portable units, as will be described in greater detail below and as is illustrated in FIG. 2. FIG. 2 illustrates the launch pad 10 having a launch vehicle mounting platform 12 and laterally extending exhaust gas channelling means in the form of ducts 14. An umbilical mast 16 carrying two umbilical cords 18, 20 is mounted on the platform 12. The umbilical cords 18, 20 supply power and a communication link to the launch vehicle 22. Additional umbilical cords are typically provided, for example an air conditioning umbilical. The umbilical mast 16 thus provides a means by which electrical and air conditioning umbilicals can be routed to the booster. These umbilicals provide control of the vehicle until lift off and cooling for the booster and payload electronics. The mast 16 is hollow to provide a protective channel for the umbilical cords and is made from a heavy material that can withstand a launch environment, for example steel. Aluminum can be used if the mast is to be a disposable mast. Typically the umbilical mast 16 is unique for the booster configuration being launched and as such may be changed after a launch for a different type of vehicle. An easy method of removal and replacement is therefore required. This could take the form of bolts passed through holes in an outwardly extending flange at the foot of the mast 16 and into threaded anchor sleeves secured in the mounting platform 12. The mast typically comprises a tube having a circular or rectangular cross section.

Figure 3:
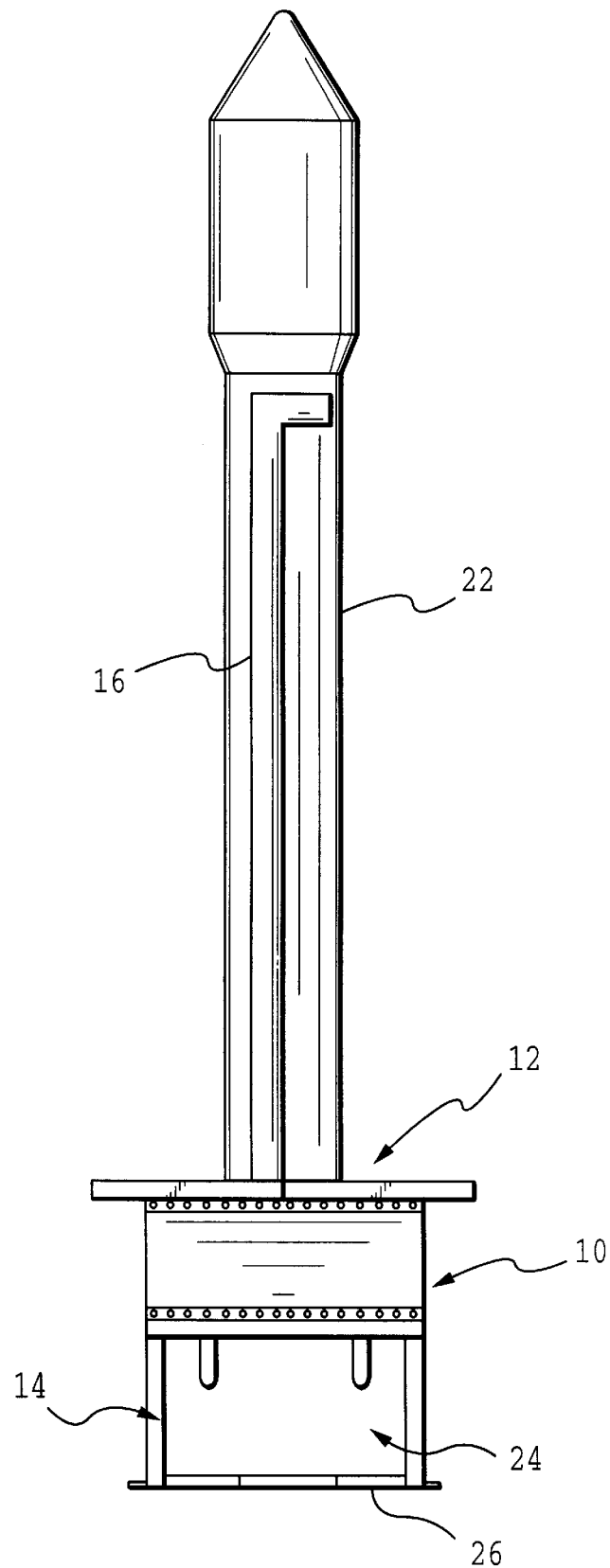
FIG. 3 is an end view of the launch pad of FIG. 2.

FIG. 3 is an end view of the launch pad 10, showing a blast deflector 24 which directs the exhaust gases from the launch vehicle 22 along the ducts 14.

Figure 4:
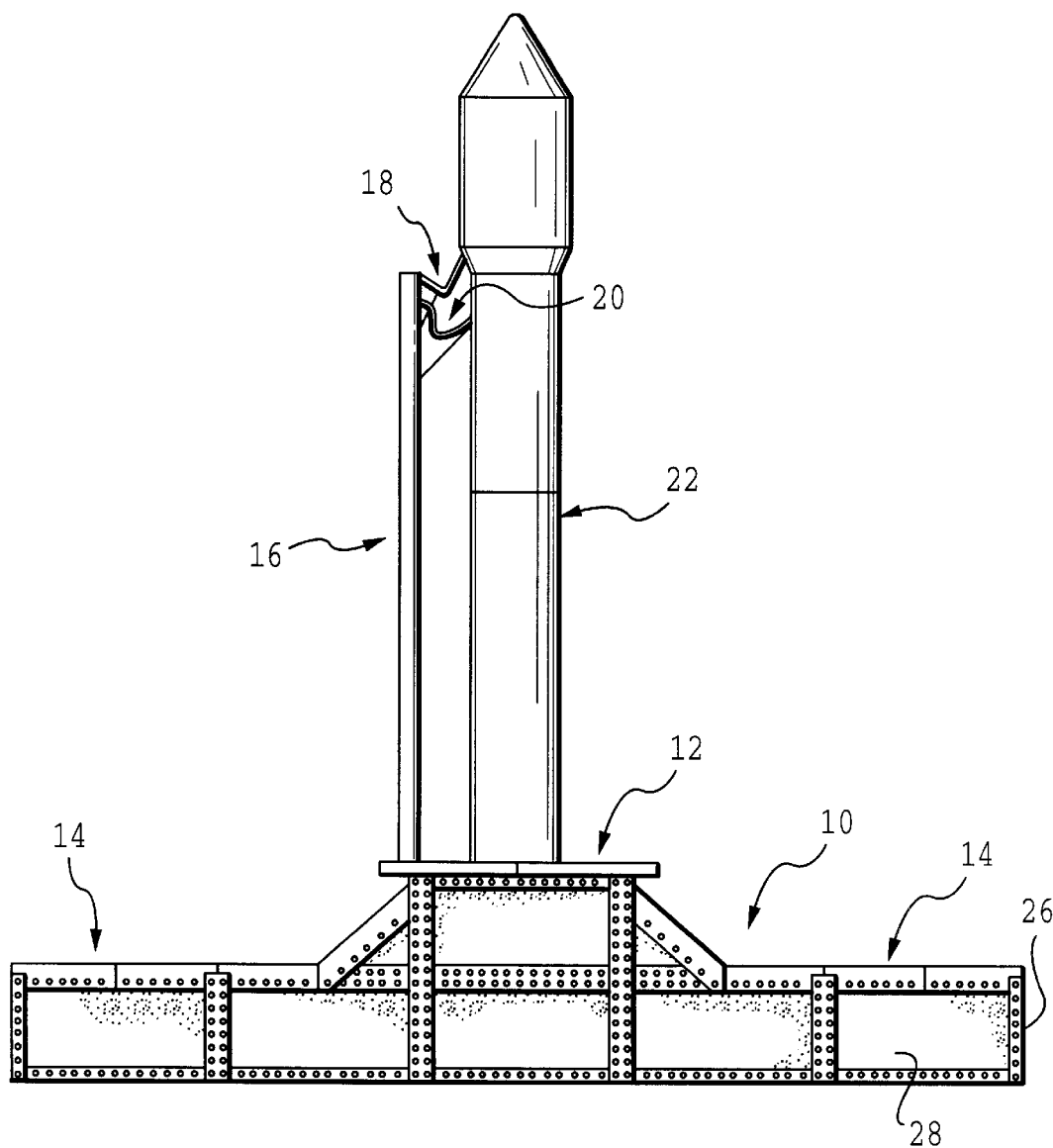
FIG. 4 is a side view of the same launch pad shown in FIG. 3.

FIG. 4 is a side view of the launch pad 10 showing more clearly the power supply umbilical cord 18 and the communication and control umbilical cord 20 connected to the launch vehicle 22 from the mast 16.

Figure 5:
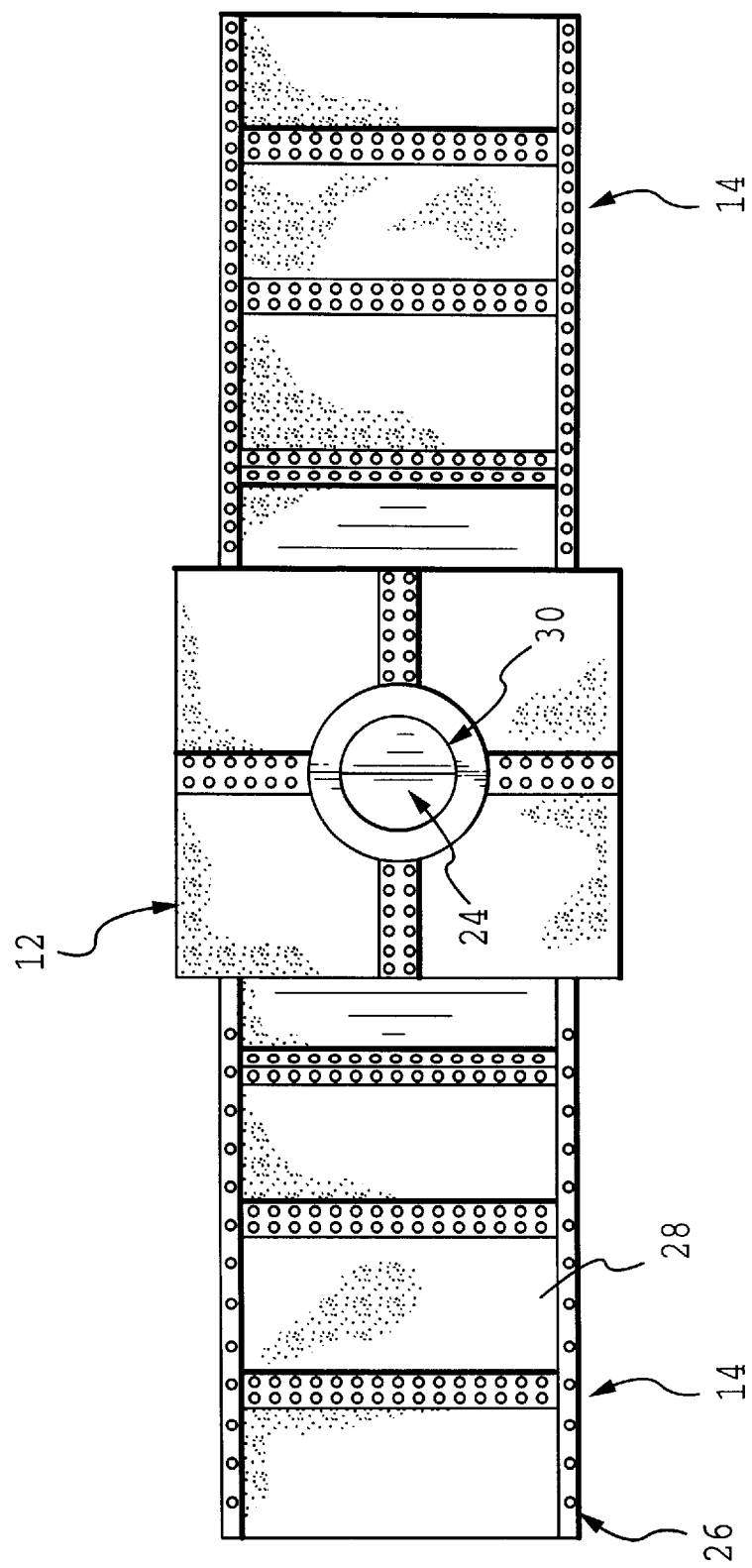
FIG. 5 is a top view of the launch pad shown in FIG. 4.

As is clearly shown in FIGS. 2 to 4, the launch pad 10 has a modular construction which includes a frame 26 and a set of concrete panels which form building units 28. This is also illustrated in FIG. 5 which shows a plan view of the launch pad 10 with its modularly constructed launch vehicle mounting platform 12 and ducts 14. The platform 12 has a central exhaust gas opening 30. The deflector 24 is visible through the exhaust gas opening 30. The frame 26, building units 28 and the manner of construction of the launch pad 10 will now be described in greater detail.

Figure 6:
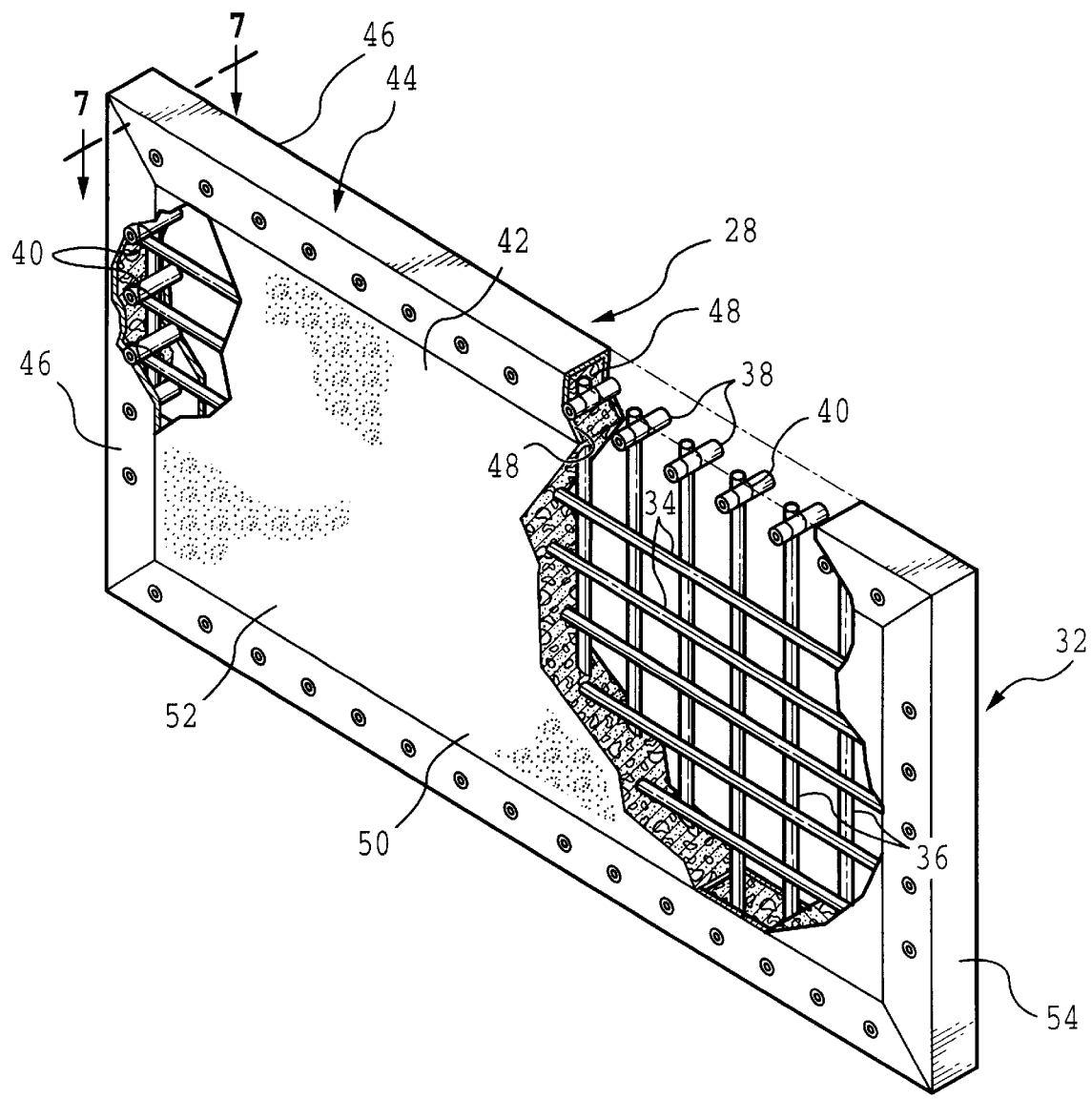
FIG. 6 is an isometric view of a modular building unit in accordance with the invention.

FIG. 6 illustrates a typical building unit which in this embodiment is a rectangular building unit 32. The building unit 32 includes a mesh of longitudinally extending reinforcement bars 34 and transversely extending reinforcement bars 36 to form a rectangular skeleton. The bars 34, 36 typically comprise 1 inch or 2 inch diameter rebars. The choice of bar diameter depends on the forces that the pad 10 has to withstand. Clearly the bars 34, 36 are not limited to rebars. They could be made of any suitable material, for example rods made from a spun carbon material.

Figure 7:
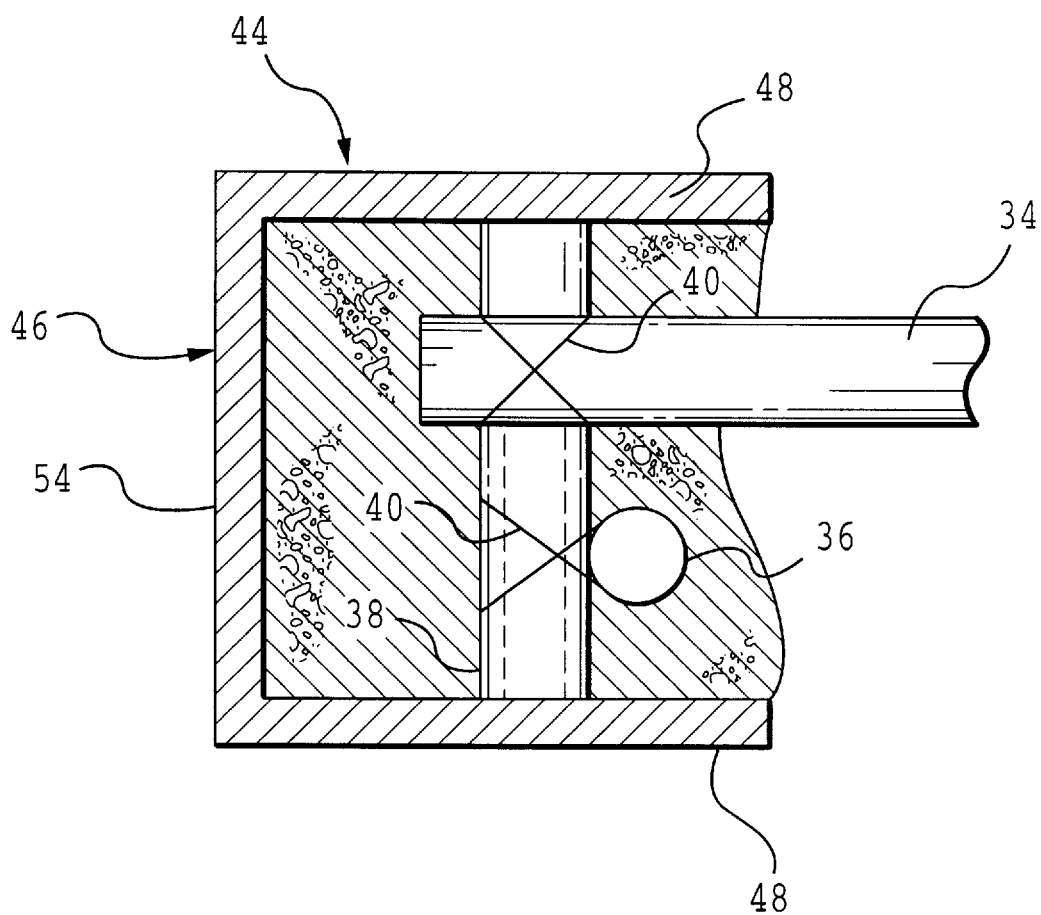
FIG. 7 is a sectional view through the building unit of FIG. 6 along the line I—I.

What makes the launch pad 10 unique is inter alia its modular construction and the manner in which the building units 28 are connected to the frame 26 and to each other. The blast created by the launch vehicle would exert excessive forces on any protruding bolts or other connectors extending into the interior of the launch pad 10 from the surfaces of the units. For this reason a system is used comprising internally threaded sleeves embedded in the units allowing the units to be bolted together using suitable brackets as described below. The internally threaded sleeves 38 are welded to a peripheral frame extending along the periphery of the skeleton as is discussed in greater detail below. The bars 34, 36 are connected near their ends to the sleeves 38 by means of pieces of wire 40, the wire connections providing the structure with added support. Clearly, the bars 34, 36 cannot cross one another centrally within the slab 42. They are therefore laterally spaced from each other as shown in FIG. 7. The transversely extending bars 36 are evenly spaced along virtually the entire length of the unit 32. Thus not only the longitudinally extending bars 34, but also the outermost transverse bars 36 are connected to the sleeves 38 extending along the lateral sides of the skeleton as illustrated in FIG. 7.

Referring again to FIG. 6, the skeleton is embedded in a concrete slab 42 which is in turn embraced by the peripherally extending frame 44. The frame 44 takes the form of U-shaped channel sections 46 made of one inch thick steel.

The channel sections are connected to one another so that the legs 48 of the U-shaped channel sections 46 are directed inwardly to embrace the major surfaces 50 of the slab 42 along the edges of the slab 42. As is shown in FIG. 6, the channel sections 46 are partially embedded in the concrete slab 42 so that the outer surfaces of the legs 48 lie flush with the major surfaces 50 of the slab 42 thereby providing a building unit having opposed smooth major faces 52. It will be appreciated that the invention is not limited to concrete but could include any suitable material having the requisite strength and heat resistance, for example a carbon phenolic material. The embodiments illustrated in FIGS. 6 and 7 are substantially identical, save for the differences set out below, and are accordingly both depicted by reference numeral 32. The sleeves 38 may extend between the outer surfaces of the legs 48 as illustrated in FIG. 6 or only between the inner surfaces of the legs 48 as illustrated in FIG. 7. In either event, the sleeves 38 are welded to the legs 48 of the U-shaped channel sections 46. Holes must be provided in at least one of the legs 48 to provide access to the threaded channels defined by the sleeves 38. As will become clear from the description of the construction of the launch pad 10, it is not essential that access be provided to the threaded channels of the sleeves 38 from both sides of the building unit 32. Thus, holes need only be provided in one of the two legs 48 of the U-shaped channel sections 46. However, for ease of construction and greater versatility, the two faces of the building unit are typically identical. In order to keep launch debris out of the threads of the sleeves and to protect the threads from high temperatures any openings are sealed after construction with a sealer. This could, for example, be a ceramic material such as the material known in the trade under the tradename MARTITE® or a high temperature rubber compound such as the compounds known in the trade as RTV-102 and Dynatherm 300. This also reduces turbulence of the launch vehicle exhaust gases by providing the structure with a smooth surface.

The above embodiment of the building unit 32 is one foot wide. The longitudinally and transversely extending reinforcement bars 34, 36 take the form of two inch rebar. The sleeves comprise internally threaded steel pipes having an outer diameter of two inches and an inner diameter of one inch. Typically all sides of the U-shaped channel sections 46 have equal dimensions, the legs 48 being 1 foot long and the back 54 being 1 foot wide. Thus the units 32 have a thickness of 1 foot. The concrete is designed to withstand a pressure of 3000 psi.

The frame 26 and the construction of the launch pad 10 will now be described.

Figure 8:
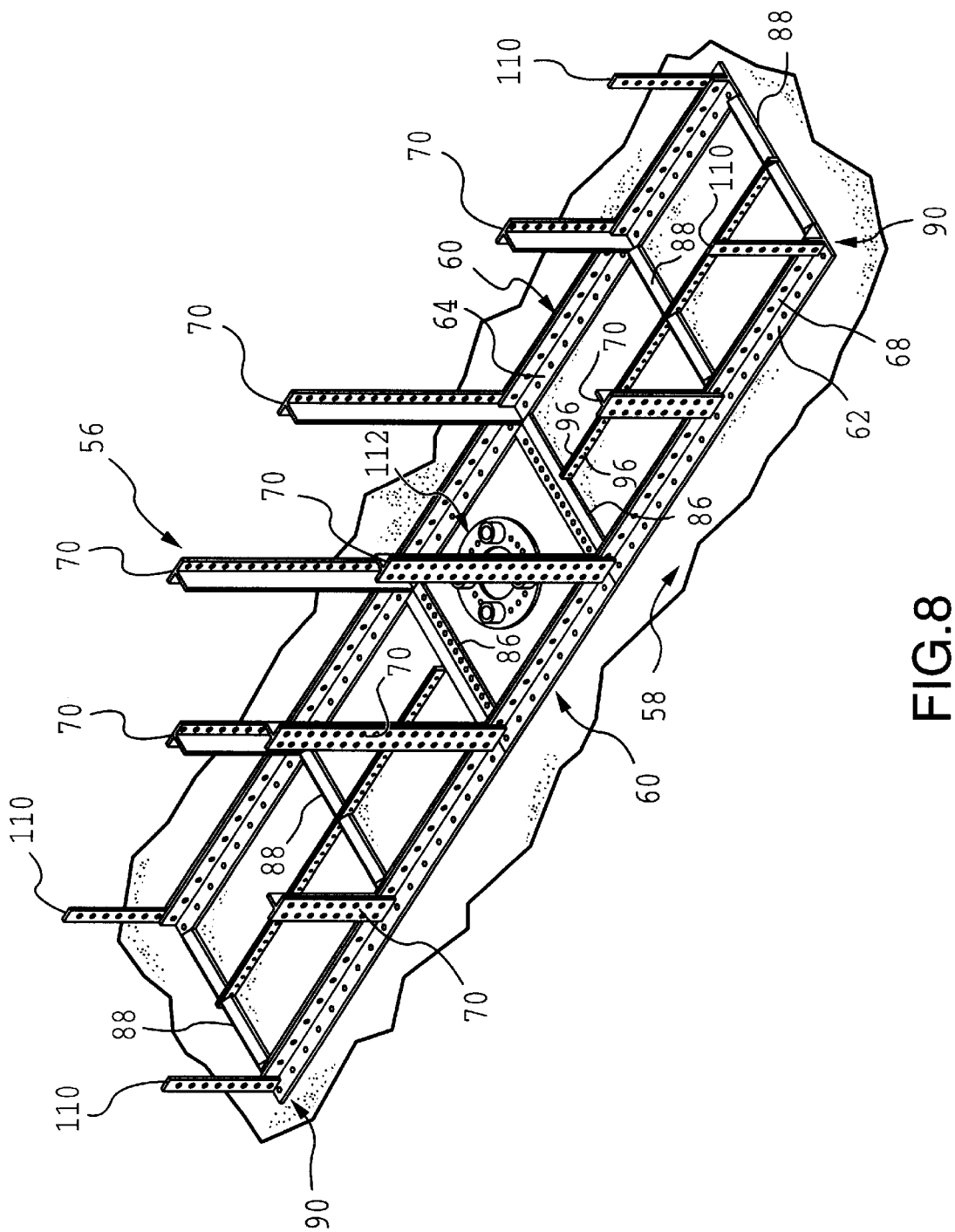
FIG. 8 is an isometric view of a frame of the launch pad.
Figure 9:
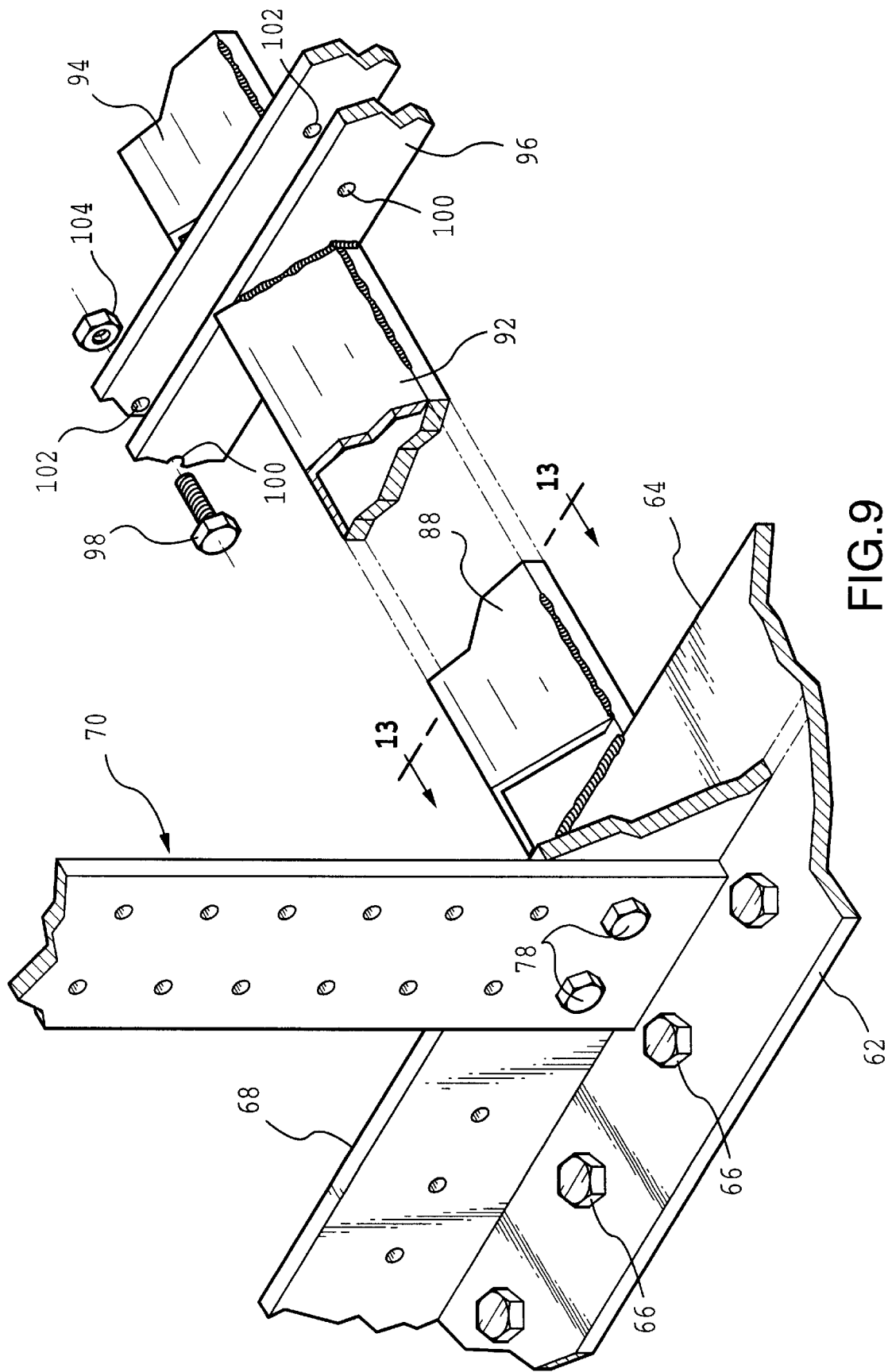
FIG. 9 is a detailed isometric view of part of the frame of FIG. 8.
Figure 10:
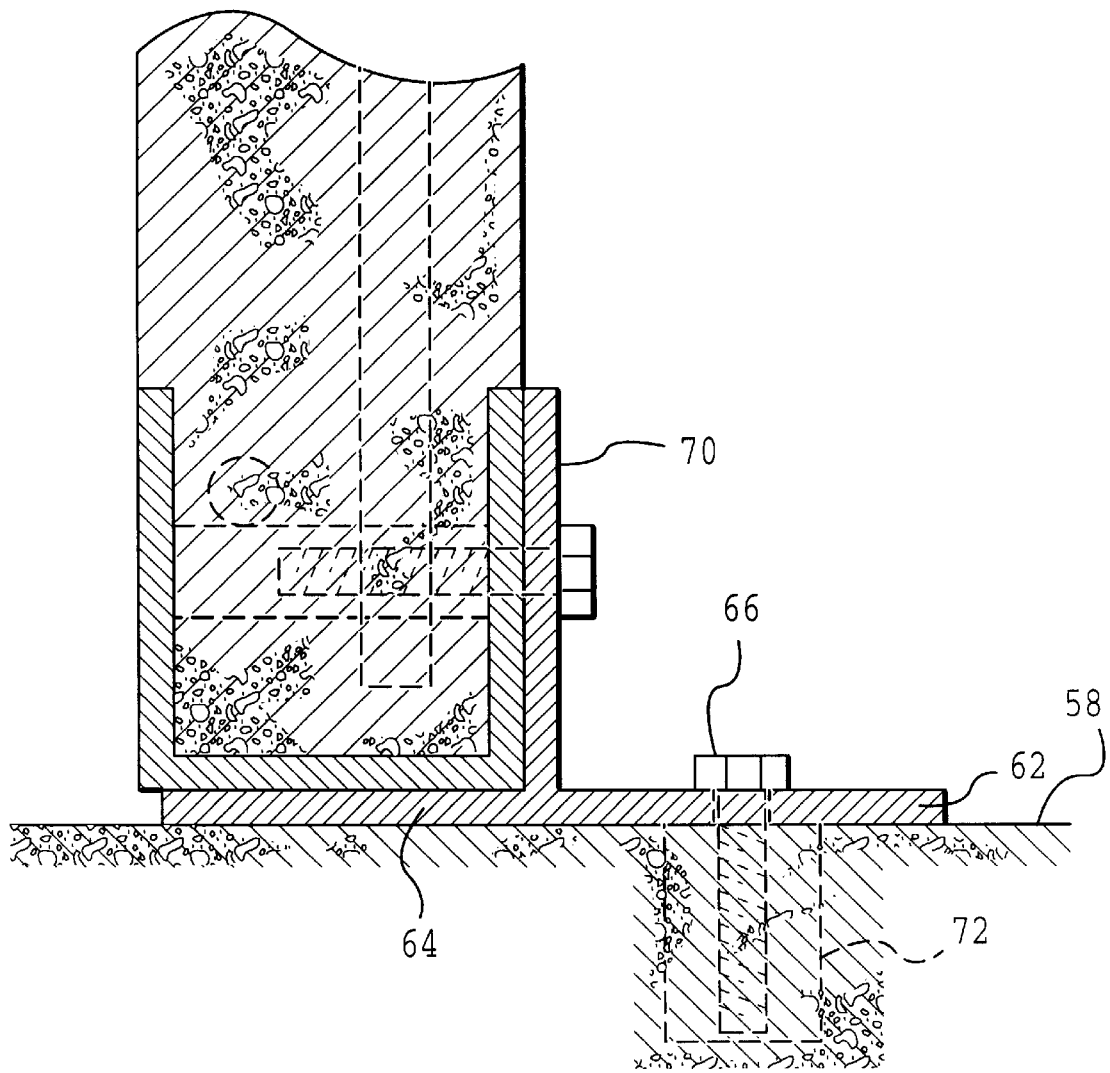
FIG. 10 is a detailed sectional view through a longitudinally extending T-bar and a building unit in accordance with the invention.

FIG. 8 illustrates the basic frame for the launch pad 10, the frame of this embodiment being indicated generally by reference numeral 56. The frame 56 is mounted on a concrete slab 58 which is cast on site. The slab 58 may be between 6 and 8 inches in thickness or, for greater safety, as thick as one foot. The frame 56 consists of a pair of longitudinally extending T-bars 60. The arms 62, 64 of the T abut the slab 58 and are secured to the slab 58 by means of 2 inch bolts 66 (FIG. 9) passed through holes in the outer arms 62. The body of the T forms an upwardly extending web 68 which serves as a support for vertically extending T-bars 70 of the frame 56. As is illustrated in FIG. 10, the bolts 66 are secured in anchor sleeves 72 embedded in the slab 58. The vertically extending T-bars 70 are each provided with a slot 74 at the lower end of the body 76 of the T in order to accommodate the web 68. This is clearly illustrated in FIG. 11 which shows bolts 78 which are passed through complimentary holes 80 in the web 68 and through holes 82 in the arms 84 of the T-bar 70. The bolts 78 are secured by engaging aligned sleeves (not shown) in the building units, as will become clearer hereinafter. The webs 68 of the T-bars 70 are 8 inches in length while the combined length of the arms 86 is 16 inches.

Figure 11:
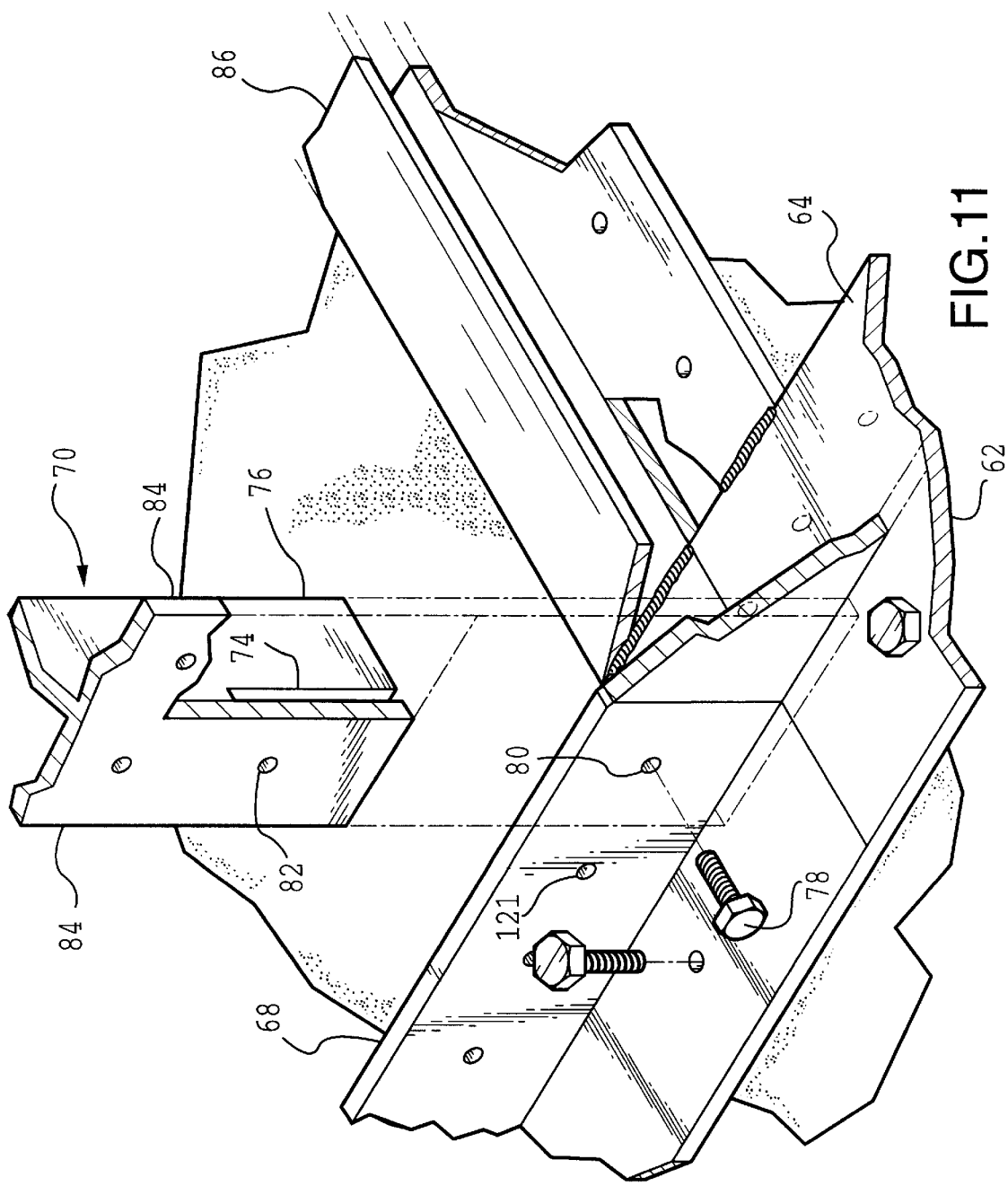
FIG. 11 is a detailed isometric view of part of the frame of the launch pad in accordance with the invention.

The longitudinally extending T-bars 60 are laterally spaced from each other by transversely extending ribs in the form of V-shaped angle irons 86 (FIGS. 8 and 11). The arms of the V are each 1 foot in length, have a thickness of 1 inch and are welded together at the vertex. The angle irons 86 act as braces for the T-bars 60, providing the frame 56 with greater support. The angle irons 86 also serve as lower terminations for the blast deflector (not shown) as will be described in greater detail below.

Figure 12:
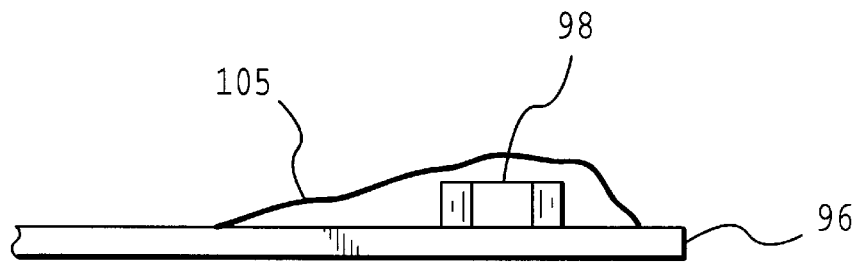
FIG. 12 is a schematic side view of a bolt connected to a longitudinally extending bar showing an insulating covering in cross section.

Further strengthening ribs 88 (FIGS. 8 and 9) having a triangular cross-sectional profile connect the ends 90 of the two longitudinally extending T-bars 60 to one another. Another set of ribs 88 is provided at the mid-point along the T-bars 60 between the end points 90 and the angle irons 86. Each rib 88 is formed in two sections 92, 94, more clearly illustrated in FIG. 9. The inner ends of the sections 92, 94 are welded to longitudinally extending bars 96. The bars 96 are connected to one another by means of bolts 98 past through complimentary aligned holes 100, 102 in the sections 92, 94, respectively and secured by means of nuts 104. The bolts 98 and nuts 104 and other exposed metal objects are covered with a protective coating, for example with the ceramic material known under the trade name MARTITE® or with a high temperature rubber compound such as the compounds known in the trade as RTV-102 and Dynatherm 300. To lessen the effects of turbulence, all coatings are ramped toward the expected flow of exhaust gases. This is illustrated in FIG. 12 in which the coating is depicted by reference numeral 105.

Figure 13:
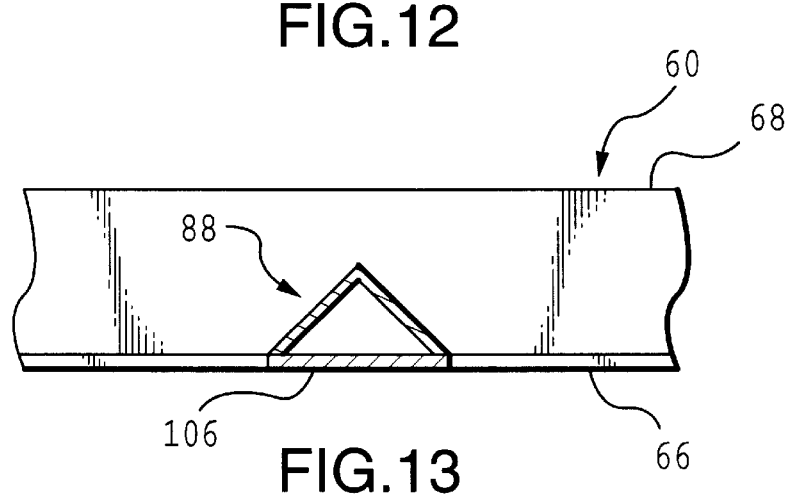
FIG. 13 is a schematic sectional side view along the line II—II of FIG. 9.
Figure 14:
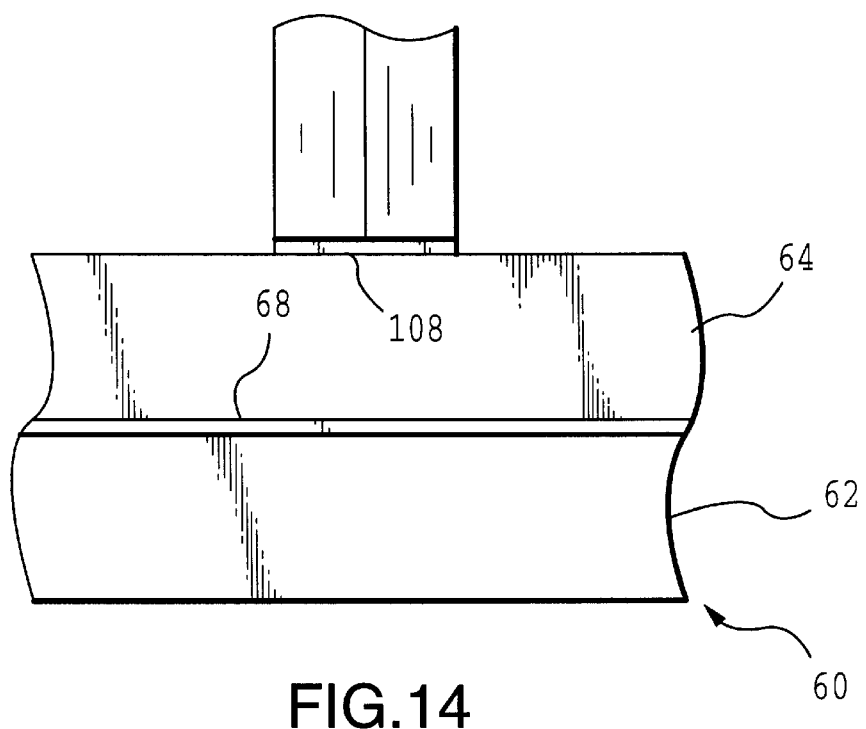
FIG. 14 is a schematic plan view of the portion of the frame of FIG. 13.
Figure 15:
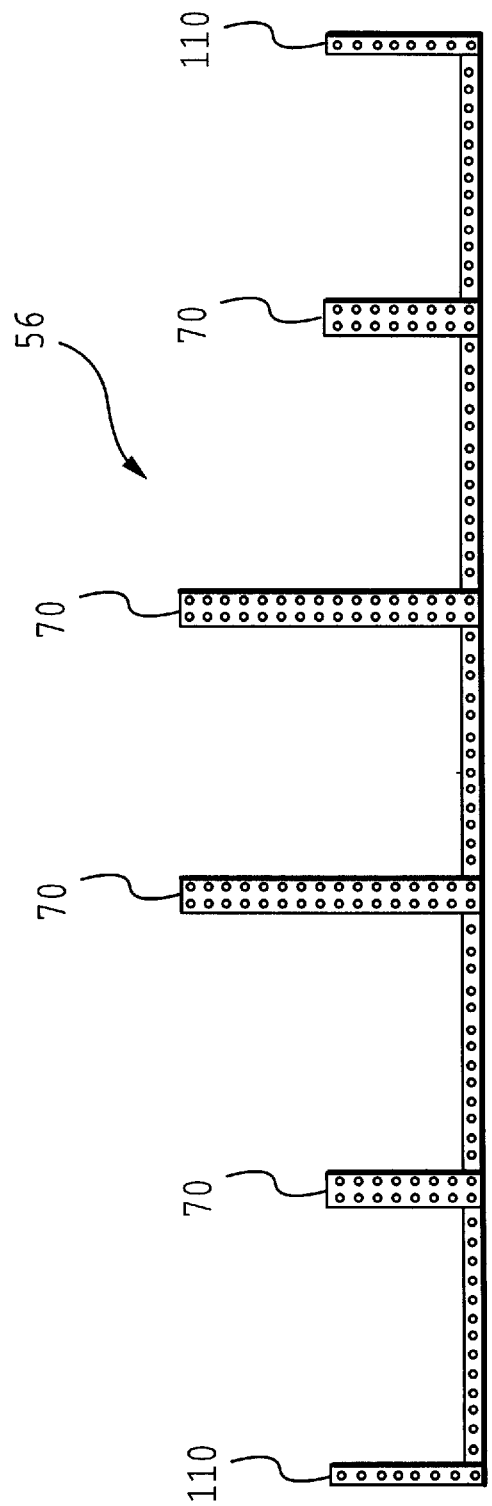
FIG. 15 is a side view of the frame of FIG. 8.

FIG. 13 shows a sectional end view of a rib 88 and a longitudinally extending T-bar 60. The base 106 of the rib 88 is typically 12 inches wide, the vertical height of the rib being 6 inches. FIG. 14 shows the rib 88 and T-bar 60 in plan view, clearly illustrating the weld joint 108 between the rib 88 and the bar 60. The weld 108 is typically of the order of one inch in thickness. Once assembled, the frame 66 includes the horizontally extending bars, rods and angle irons 60, 86, 88 and 96, four pairs of vertically extending T-bars 70 and two pairs of vertically extending elongate corner plates 110. This is illustrated in FIG. 8. A side view of the frame 56 is also shown in FIG. 15.

As is shown in FIG. 8, a launch mount base ring 112 is bolted to the slab 58 between the longitudinally extending T-bars 60 and the angle irons 86. The base ring 112 will be described in greater detail below.

Figure 16:
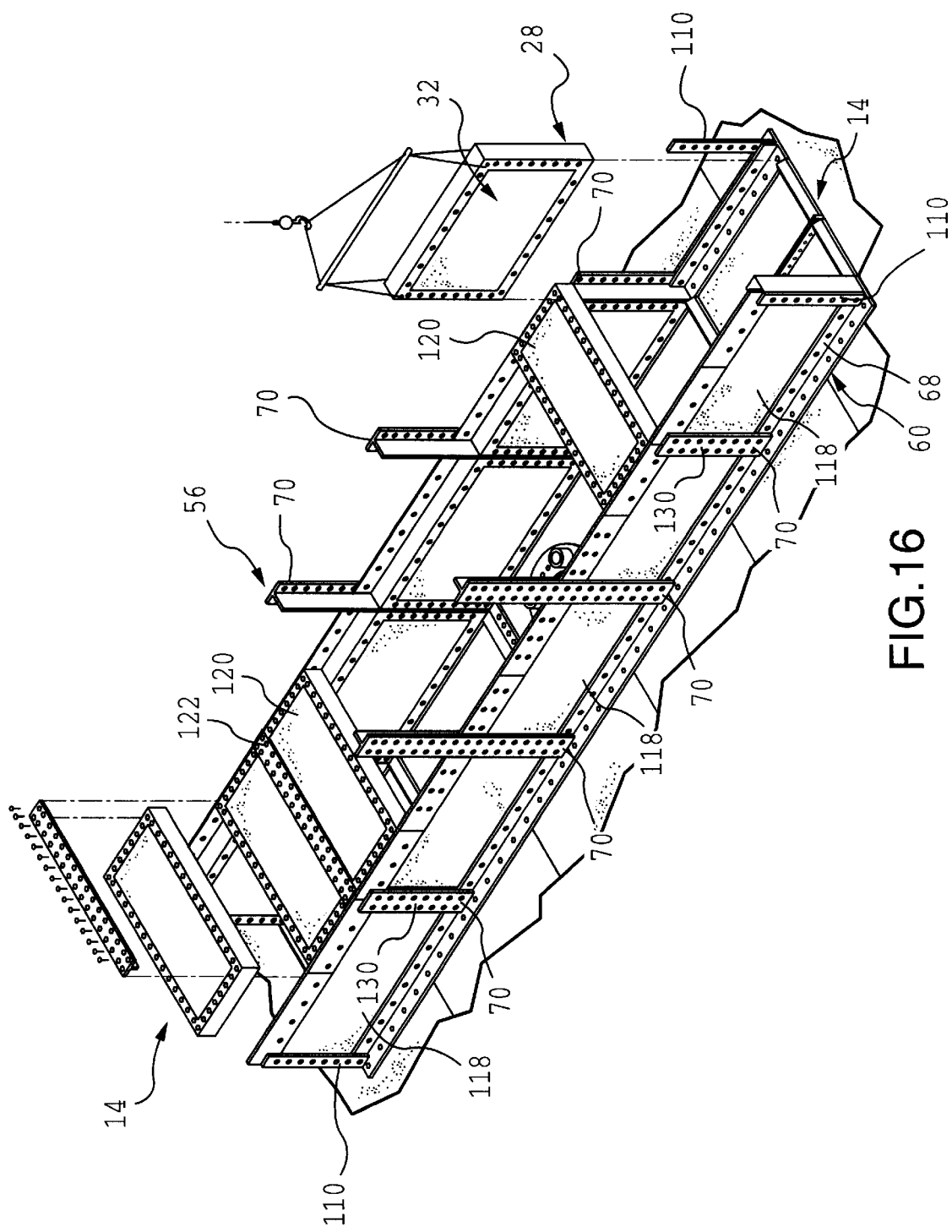
FIG. 16 is an isometric view of the launch pad of FIG. 2 in a partially assembled state.
Figure 17:
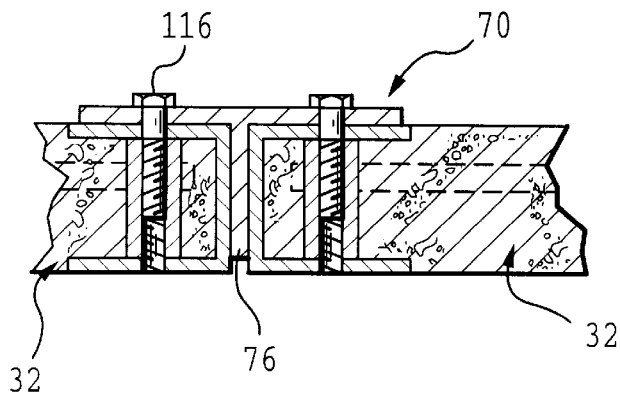
FIG. 17 is a sectional plan view through a pair of building units connected by a vertically extending T-bar in accordance with the invention.
Figure 18:
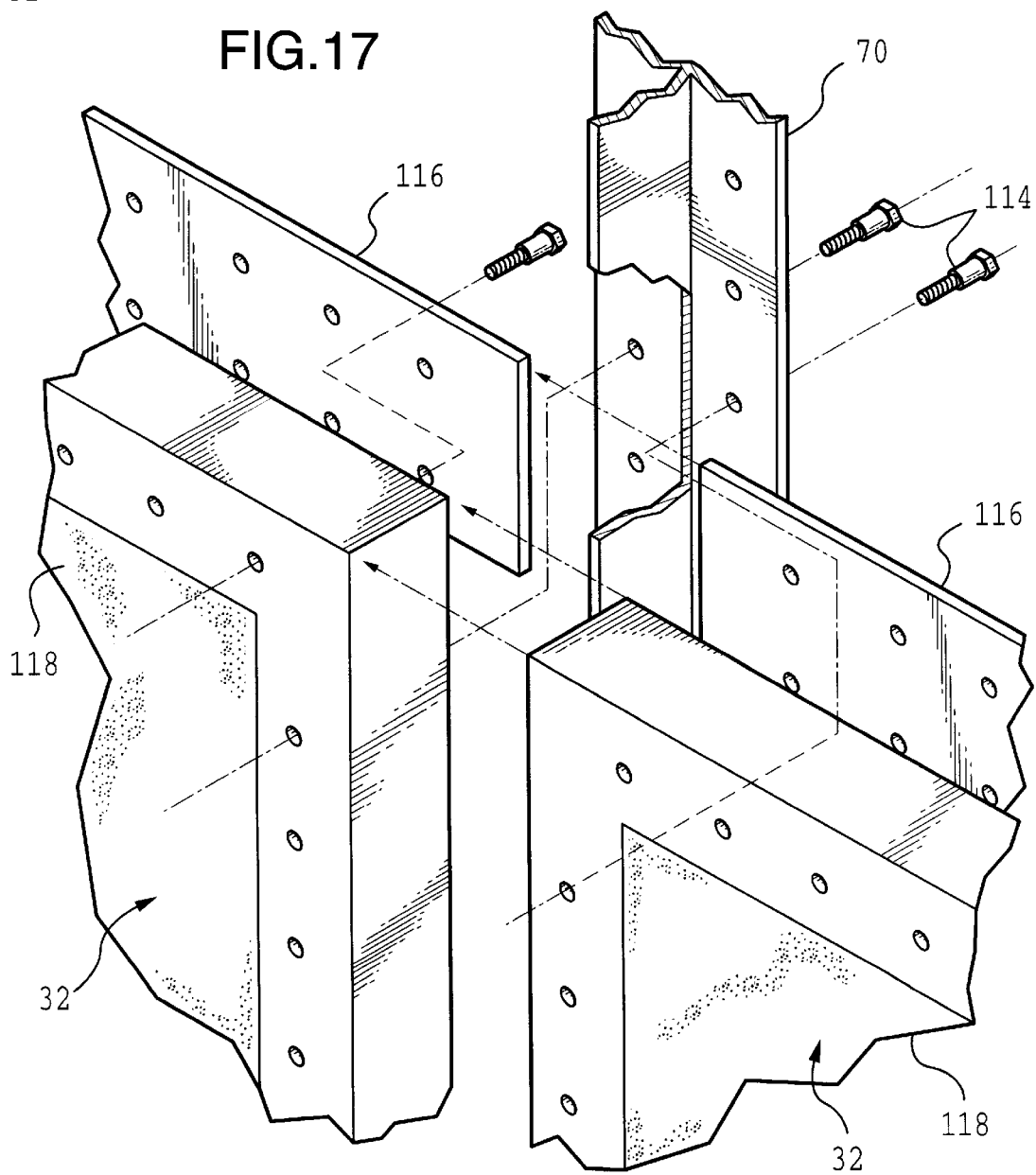
FIG. 18 is an exploded isometric view of the units and T-bar of FIG. 17.

Once the frame 56 has been erected, the building units 28 are placed in position by means of regular cranes as illustrated in FIG. 16. In order to erect the side walls of the pad 10, rectangular building units 32 are placed in position so as to abut the longitudinally extending T-bars 60 along inner surfaces of the arms 64 and the webs 68. The units 32 also abut the vertically extending T-bars 70 along the inner surfaces of the arms 84 and bodies 76. The outermost building units 32 further abut inner surfaces of the vertically extending end plates 110. Referring to FIGS. 17 and 18, the building units 10 are secured to the vertically extending T-bars 70 by means of bolts 114. The bolts 114 also pass through horizontally extending connector plates 116 having a thickness of 2 feet and a thickness of 1 inch. As will become clearer hereinafter, the plates 116 serve to connect the vertically extending building units 118, forming the side walls, to the horizontally extending building units 120 (FIG. 16) which act as covers for the ducts 14. The connection of the units 32 to the various T-bars and plates is accomplished by means of bolts passed through holes in the frame 56 and into the sleeves 38 of the units 32. For instance, as was mentioned with respect to FIG. 11, the bolts 78 pass into the threaded sleeves of the vertical building units 118. The lower ends of the units 118 are further connected to the webs 68 of the longitudinally extending T-bars 60 by means of bolts (not shown) passed through holes 121 (FIG. 11) in the webs 68.

Figure 19:
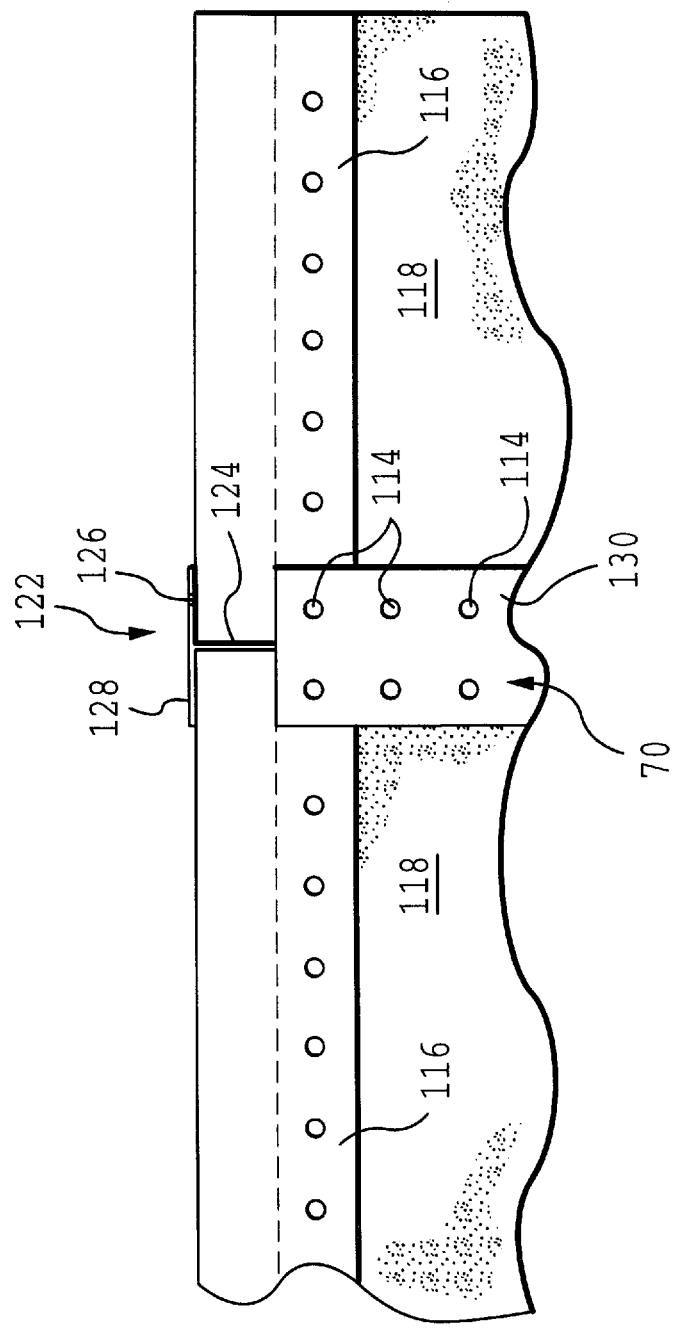
FIG. 19 is a schematic side view of a vertically extending T-bar, a pair of horizontally extending connector plates and a horizontally extending T-beam for securing horizontally extending building units to vertically extending building units in accordance with the invention.

A more detailed side view of the connection of the horizontally extending building units (not shown) to the vertically extending units 118 is shown in FIG. 19. A vertically extending T-bar 70 is bolted to the connector plates 116 by means of the uppermost pair of the bolts 114. Vertically extending units 118 are bolted to both the T-bar 70 and the plates 116 as described above. The plates 116 are in turn welded to the metal frames of the horizontally extending building units. A horizontally extending T-beam 122 is thereafter placed between the units 120 with the central web 124 of the T-beam 122 extending between the ends of the units 120. The T-beam is provided with holes 126 extending through its arms 128. This permits the T-beam 122 to be bolted to the units 120 by means of bolts (not shown) passed through the holes 126 into aligned sleeves of the units. It will be appreciated that the side view illustrated in FIG. 19 shows one of the short outer T-bars 70 which are indicated by reference numeral 130 in FIG. 16. The long inner T-bars are not provided with connector plates but are instead connected to angle irons as is described below.

Figure 20:
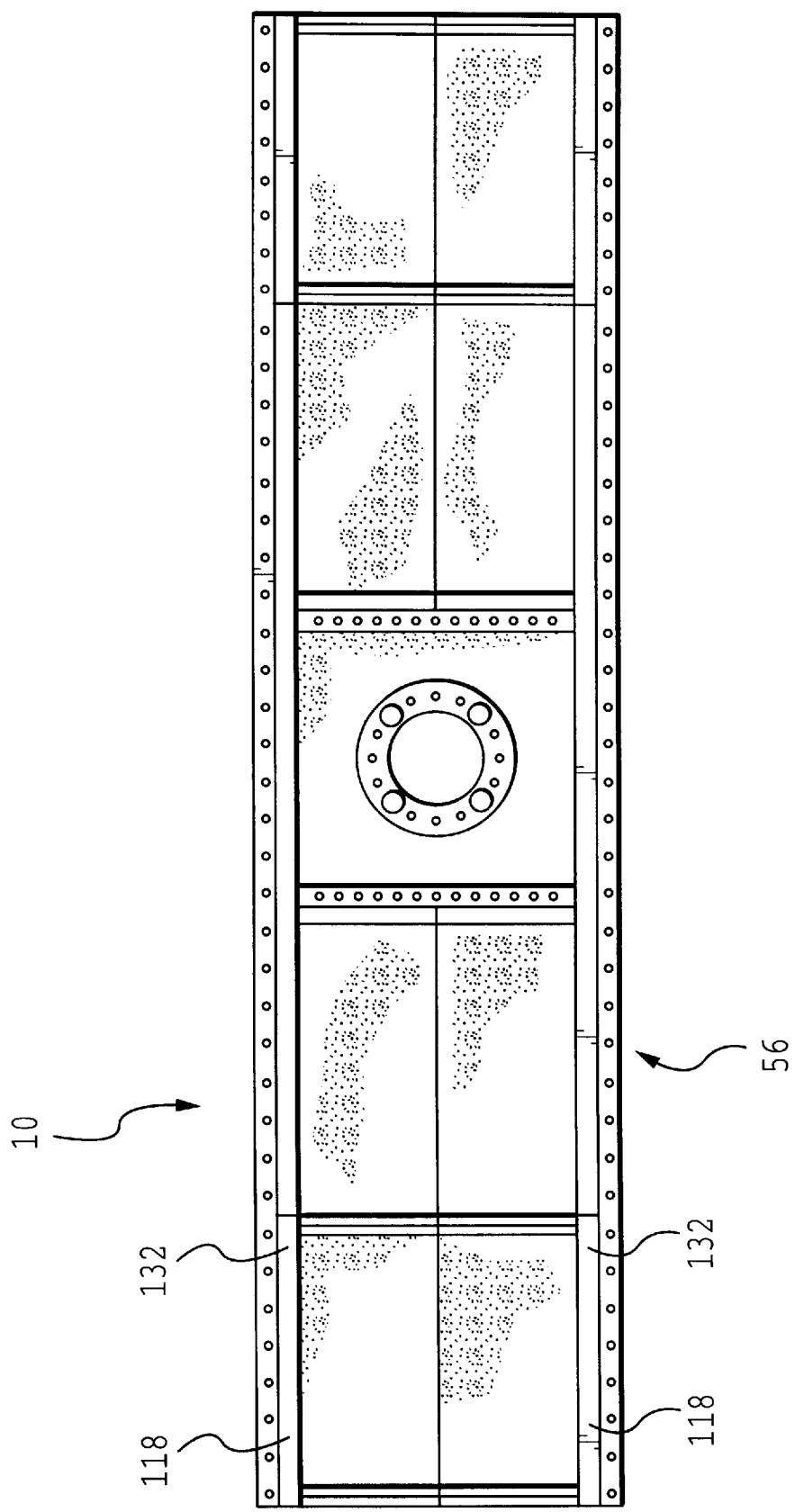
FIG. 20 is a plan view of the launch pad in accordance with the invention, in a partly assembled state.
Figure 21:
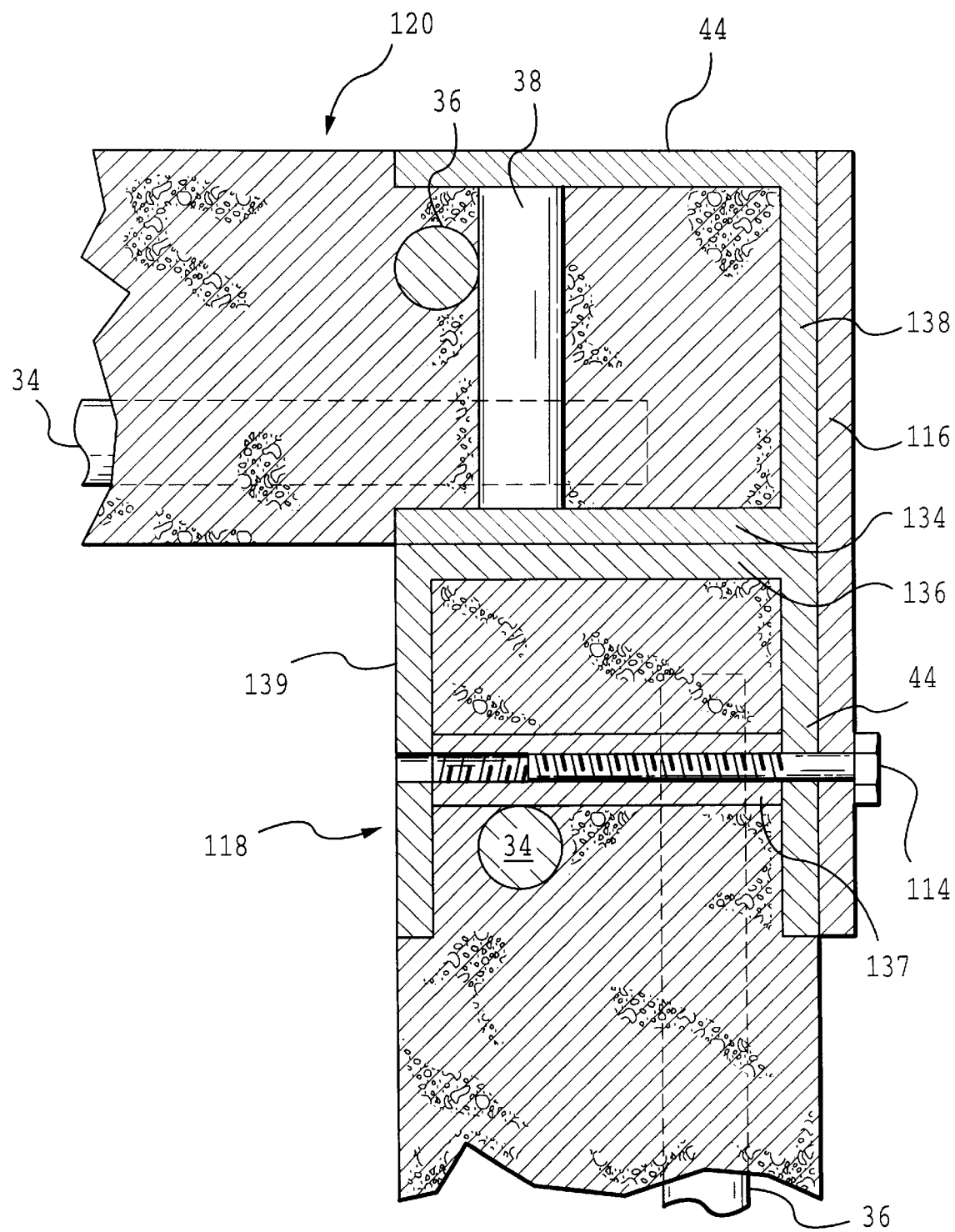
FIG. 21 is a sectional view of a vertically extending unit connected to a horizontally extending unit by a connector plate in accordance with the invention.

FIG. 20 shows a plan view of the launch pad 10 in a partially assembled state showing the vertically extending building units 118 secured to the frame 56. The upper edges 132 of the units 118 act as resting surfaces for the ends of the horizontally extending building units (not shown in FIG. 20). This is best seen in FIG. 21. When the horizontally extending unit 120 is placed on top of the vertically extending unit 118 the lower leg 134 of the unit frame 44 of the unit 120, abuts the back 136 of the frame 44 of the unit 118. The connector plate 116 is bolted to the units 120 and 118 by passing bolts 114 through holes in the plate 116, and into the threaded sleeves 137. The plate 116 is, in turn, welded to the back 138 of the unit 120. In the embodiment illustrated in FIG. 21 the sleeve 137 in the unit 118 extends between the inner walls of the frame 44 while the bore which provides access to the threaded channel of the sleeve 137 passes through both legs of the U-shaped channel section 139.

Figure 22:
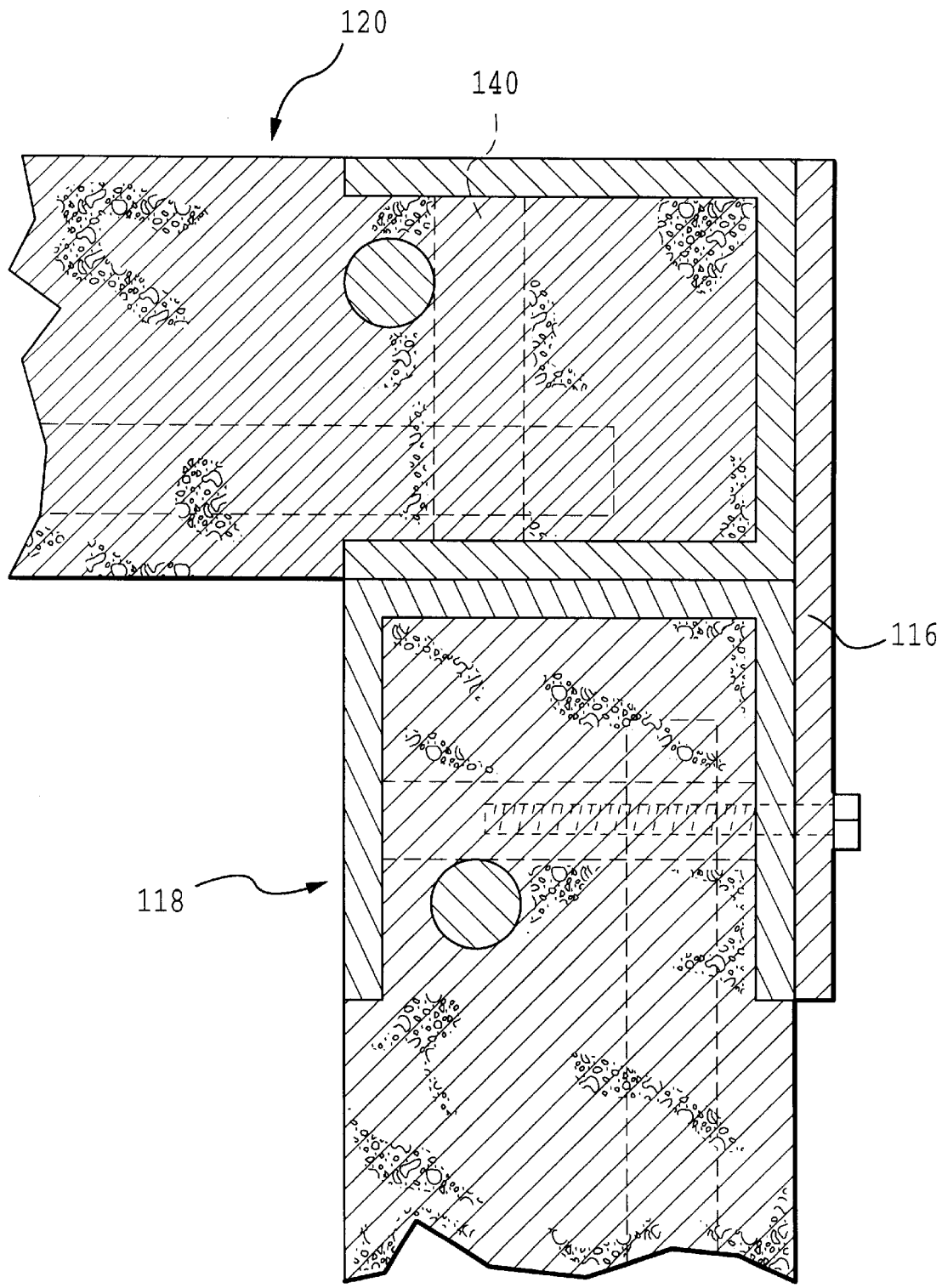
FIG. 22 is a sectional view through a vertically extending unit connected to a horizontally extending unit by a connector plate in accordance with another embodiment of the invention.

FIG. 22 shows substantially the same picture as that in FIG. 21, except that the sleeve extends through the outer leg of the channel section as well as through the plate 116. In this embodiment the plate, 116 is secured to the unit 118 at the time of manufacture. Once the launch pad 10 is assembled, the plate 116 is welded to the unit 120. It will be appreciated that in the embodiment illustrated in FIG. 21 the plate 116 could first be welded to the unit 120 before placing it on top of the unit 118 and bolting it thereto. The embodiment illustrated in FIG. 22 further differs insofar as a bore extends into the threaded channel of the sleeve through the outer leg of the frame only. Since the sleeves 140 perform no connector function in the horizontal units 120, they can instead be replaced with 2 inch steel rods welded to the frames of the units 120.

Figure 23:
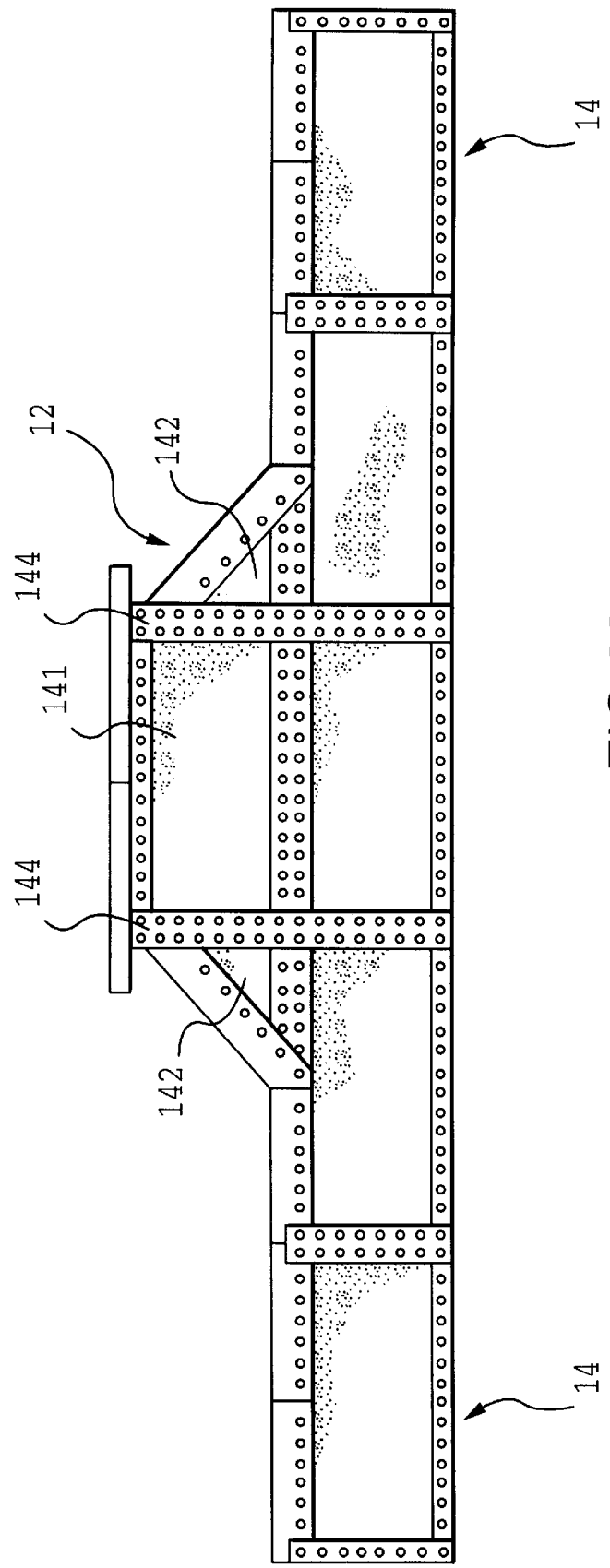
FIG. 23 is a side view of the launch pad in accordance with the invention.
Figure 24:
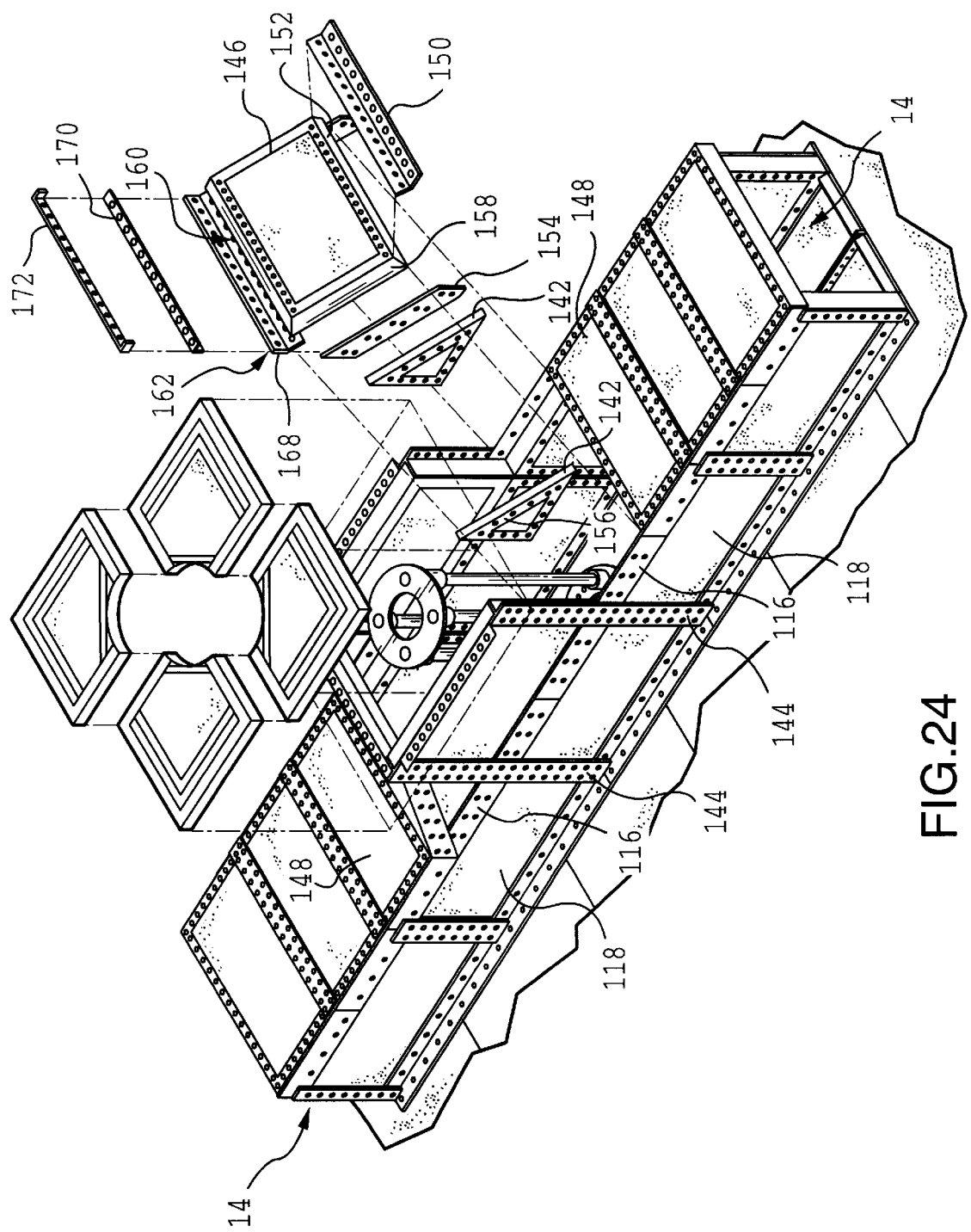
FIG. 24 is a partially exploded isometric view of the launch pad of FIG. 23.

Once the horizontally extending units 120 have been secured to define the ducts 14 as illustrated in FIGS. 23 and 24, the launch vehicle mounting platform 12 has to be assembled. The mounting platform 12 comprises a pair of opposed building units 141 lying in parallel vertical planes. The units 141 have a rectangular shape and are identical in construction to the units 118 and 120. Triangular building units 142 are secured to the units 141 on either side of the units 141. The triangular units 142 are similar in construction to the rectangular units described with reference to FIG. 6 except that the shape differs. Each triangle 142 is secured to a rectangular unit 141 by means of one of the long vertically extending T-bars 144. Along its base, the triangle 142 is secured to a vertically extending unit 118 as illustrated in FIG. 24. The connection to the unit 118 is achieved by means of the connector plate 116. Once the triangular building units 142 are in place, a pair of slanted building units 146 are secured in place on top of the units 142. The building units 146 are provided with longitudinally extending bevelled edges to permit the units 146 to be secured in a slanted manner as described below.

The lower slanted edge of each unit 146 is connected to the adjacent horizontal unit 148 by means of an angle iron 150 having spaced holes along both of its arms. Bolts are passed through the holes in the angle iron 150 and into aligned sleeves embedded in the adjacent unit 148 and in the bevelled edge 152 of the unit 146. Suitably shaped 1 inch thick steel connector plates 154 are bolted to the slanted sides 156 of the triangular building units 142. The plates 154 are then bolted or welded to the lateral edges 158 of the units 146. Clearly if the plates 154 are to be bolted to the edges 158, threaded sleeves have to be cast into the units 146 so as to extend laterally into the units 146 from the edges 158. This differs from the orientation of the sleeves 38 in the FIG. 6 embodiment.

Figure 25:
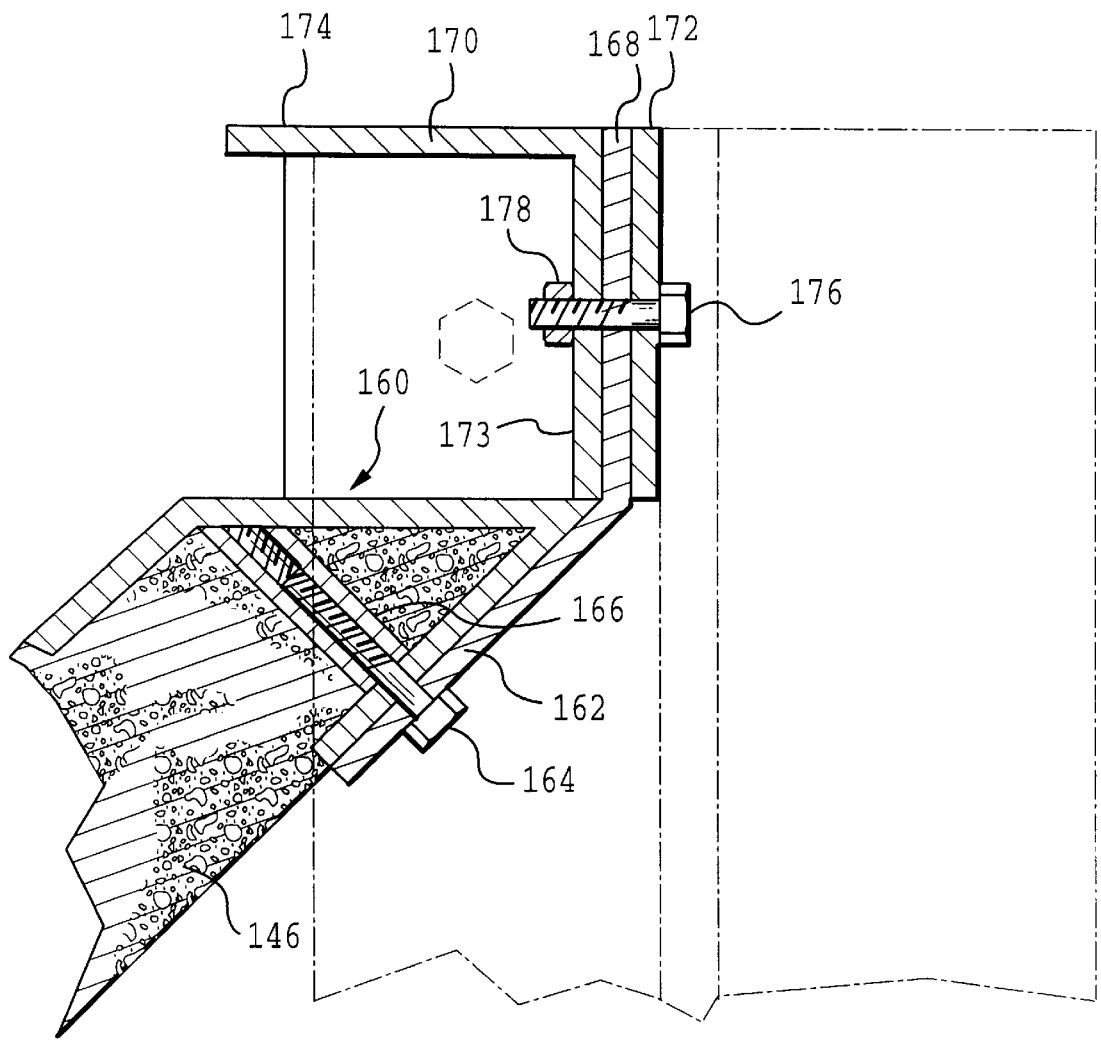
FIG. 25 is a sectional view through a slanted unit and bracket system for connecting platform plates to the slanted unit in accordance with the invention.
Figure 26:
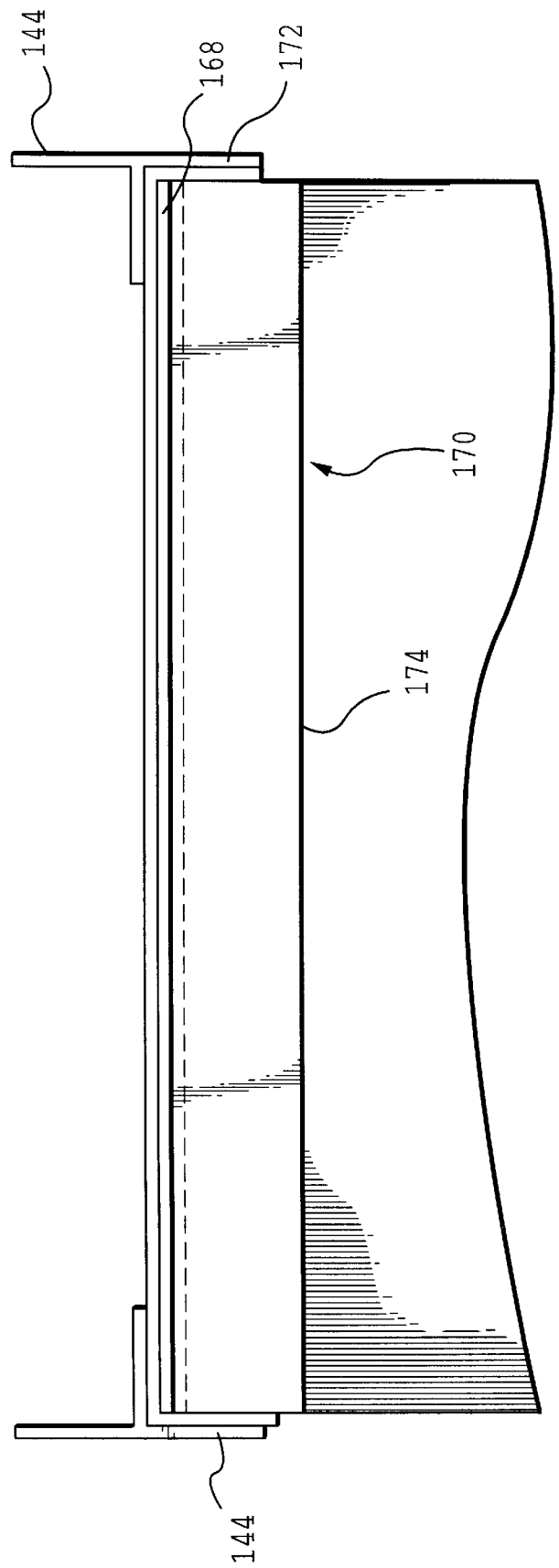
FIG. 26 is a plan view of the slanted unit and brackets of FIG. 25.
Figure 27:
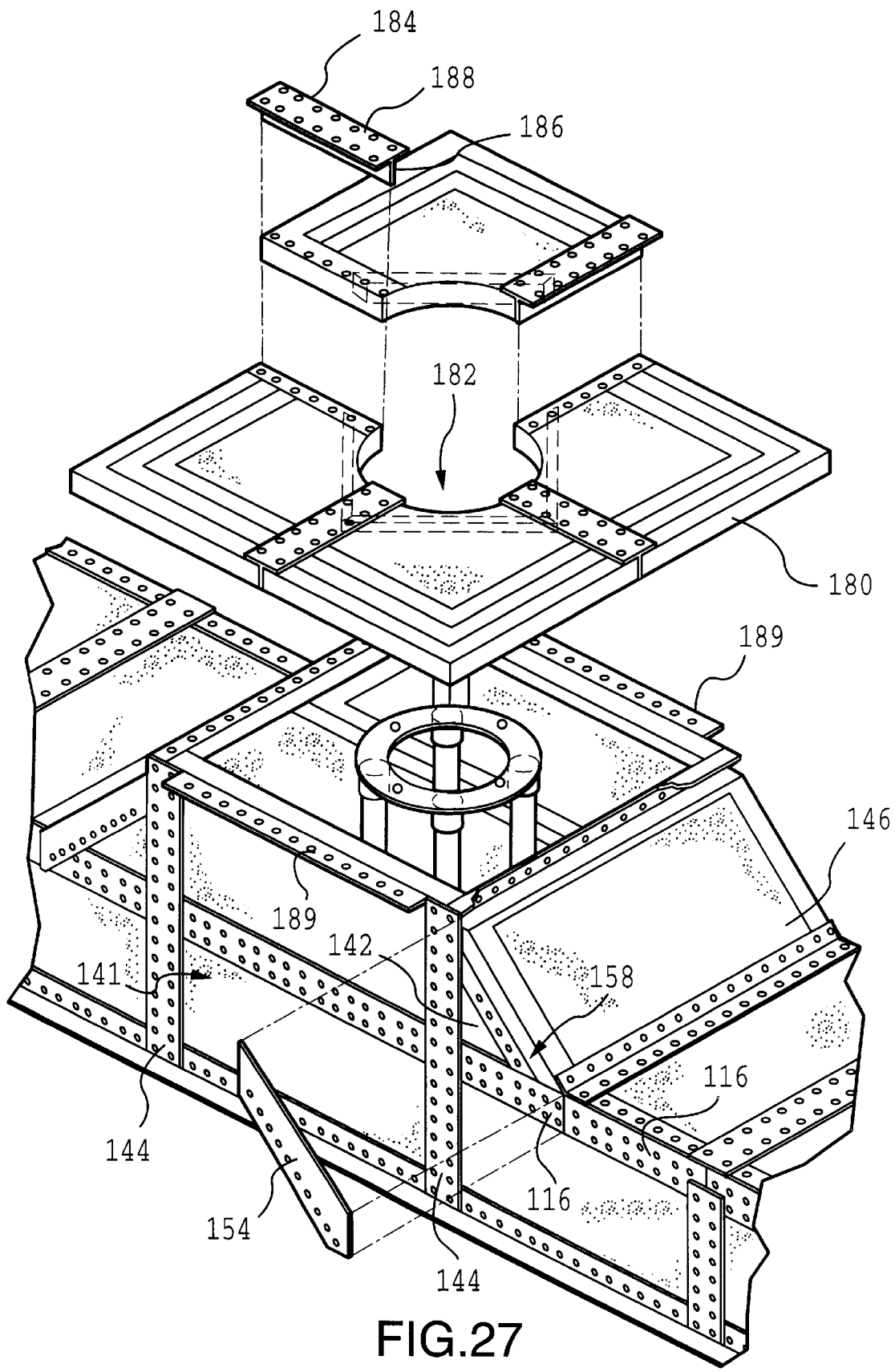
FIG. 27 is a partially exploded isometric view of the launch vehicle mounting platform in accordance with the invention.
Figure 28:
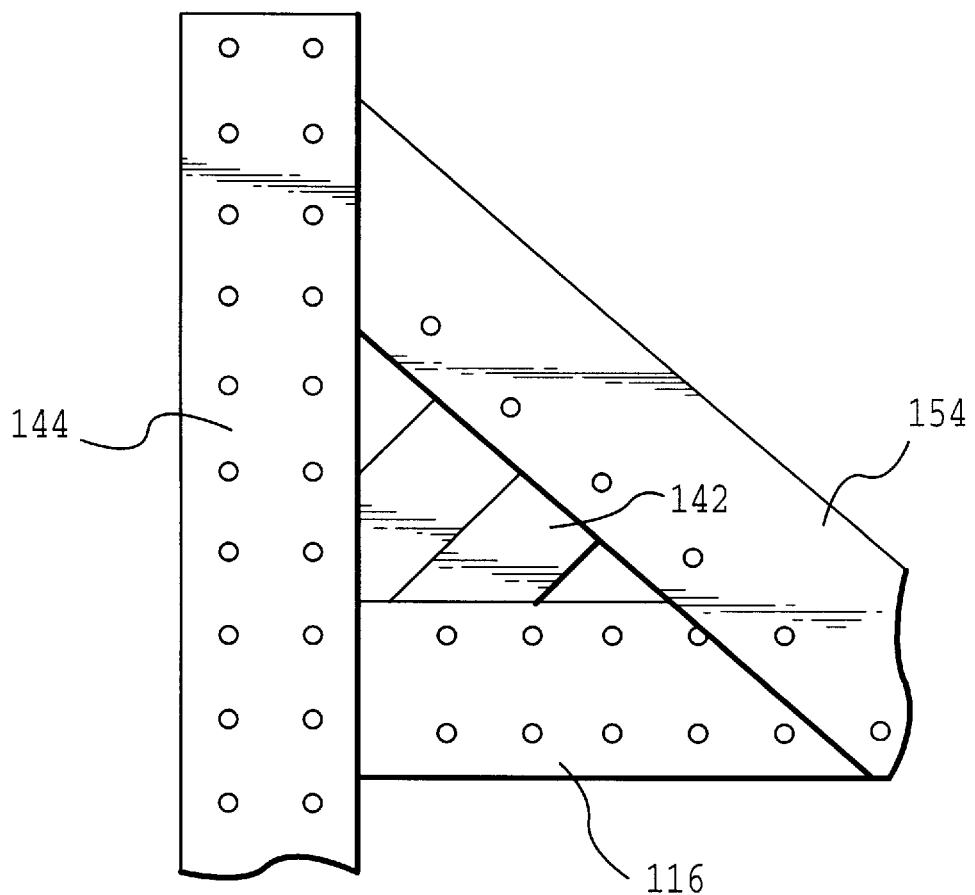
FIG. 28 is a detailed schematic side view of a triangular unit attached to plates and a T-bar.

The upper end 160 of the unit 146 is connected to a set of three brackets as illustrated in FIGS. 24 and 25. A V-shaped angle iron 162 is bolted by means of bolts 164 to the building unit 146. The bolts 164 are received in sleeves 166 secured in the unit 146. The free leg 168 of the angle iron 162 is provided with a plurality of spaced apart holes and forms a support surface for the second bracket 170 and third bracket 172. The bracket 170 takes the form of an angle iron, the legs of which have spaced apart, longitudinally extending holes passing therethrough. The one leg 173 of the bracket 170 is attached to the free leg 168 of the angle iron 162 to abut the outer face of the free leg 168. The other leg 174 of the bracket 170 extends outwardly to provide a horizontal support surface as shown in FIG. 25. The third bracket 172 comprises an elongate plate the ends of which are bent to extend perpendicularly outwardly as shown in FIG. 24. The bracket 172 is secured to the inner surface of the leg 168 so that the outwardly bent ends are receivable between the vertically extending T-bars 144 as shown in FIGS. 26 and 27. Bolts 176 and nuts 178 secure the three brackets 162, 170 and 172 to one another. It is thus clear that the bracket 162 serves as a support for the other two brackets. The bracket 170 then provides a connecting formation for the platform plates 180 illustrated in FIG. 27 and described in greater detail below. The bent ends of the bracket 172 provide connecting formations for connection to the T-bars 144. Referring to FIGS. 27 and 28, each laterally located, slanted connector plate 154 can be secured at its upper and lower ends externally to a T-bar 144 and a connector plate 116. The upper edge of the plate 154 is connected to the edge 158 of the slanted unit 146. The lower edge of the plate 154 is bolted to the triangular unit 142. In the embodiments illustrated in FIGS. 27 and 28 the connections to the edges 158 take the form of a weld.

Referring again to FIG. 27, the platform plates 180 comprise square building units having a semi-circular cutaway portion to define an exhaust gas opening in the form of a central hole 182 when the four plates 180 are connected. As shown in FIG. 27, the four plates 180 are secured to one another along their opposed edges by means of T-bars 184. The body 186 of the T forms a web intermediate the opposed edges of the plates 180. Holes are provided in the arms 188 of the T, thereby allowing the T to be bolted to two adjacent plates 180. The transversely extending sides of the plates 180 are secured to the brackets 170 by means of bolts passed upwardly through the holes in the legs 174 into threaded sleeves embedded in the plates 180.

Figure 29:
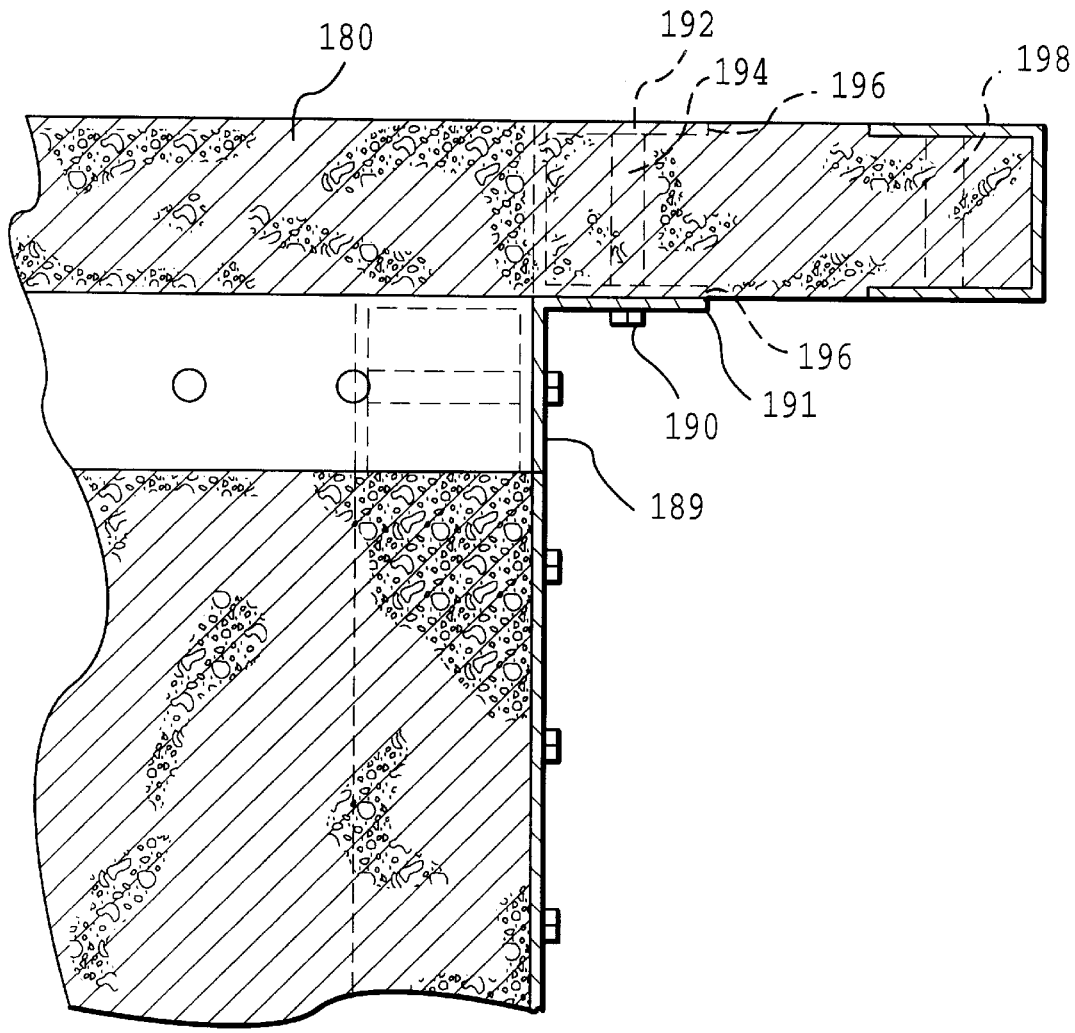
FIG. 29 is a sectional end view of part of the launch vehicle mounting platform in accordance with the invention.

The longitudinally extending sides are connected to angle irons 189 bolted to the upper ends of the units 141 as shown in FIG. 27. The angle irons 189 have arms which are 1 foot in length. FIG. 29 shows a plate 180 bolted to an angle iron 189. Bolts 190 (one shown) pass through the horizontal leg 191 into the plate 180. The plates 180 differ from the building units described so far in that a second U-shaped channel 192 is embedded in the concrete of the plate 180. Internally threaded sleeves 194 are also embedded in the concrete in a similar manner as was described with respect to FIG. 6 for the sleeves 38. In the plate 180 illustrated in FIG. 29 the arms 196 of the channel 192 are directed outwardly. Clearly threaded sleeves are not required along the outer free edges of the plates 180. However, in order to accommodate the T-bars 184 between the plates 180, sleeves are embedded along the edges opposing the edges of adjacent plates 180. These sleeves are indicated in FIG. 29 by reference numeral 198. The sleeves 194, 198 also serve as connecting formations for the internally extending reinforcement bars (not shown). The bars are connected to the sleeves 194, 198 by means of pieces or wire as was described with reference to FIGS. 6 and 7. Aside from the shape of the plate 180, the addition of the channel 192 and the positioning of the sleeves, the construction of the plates 180 is the same as that described for the building unit 32 in FIG. 6.

Figure 30:
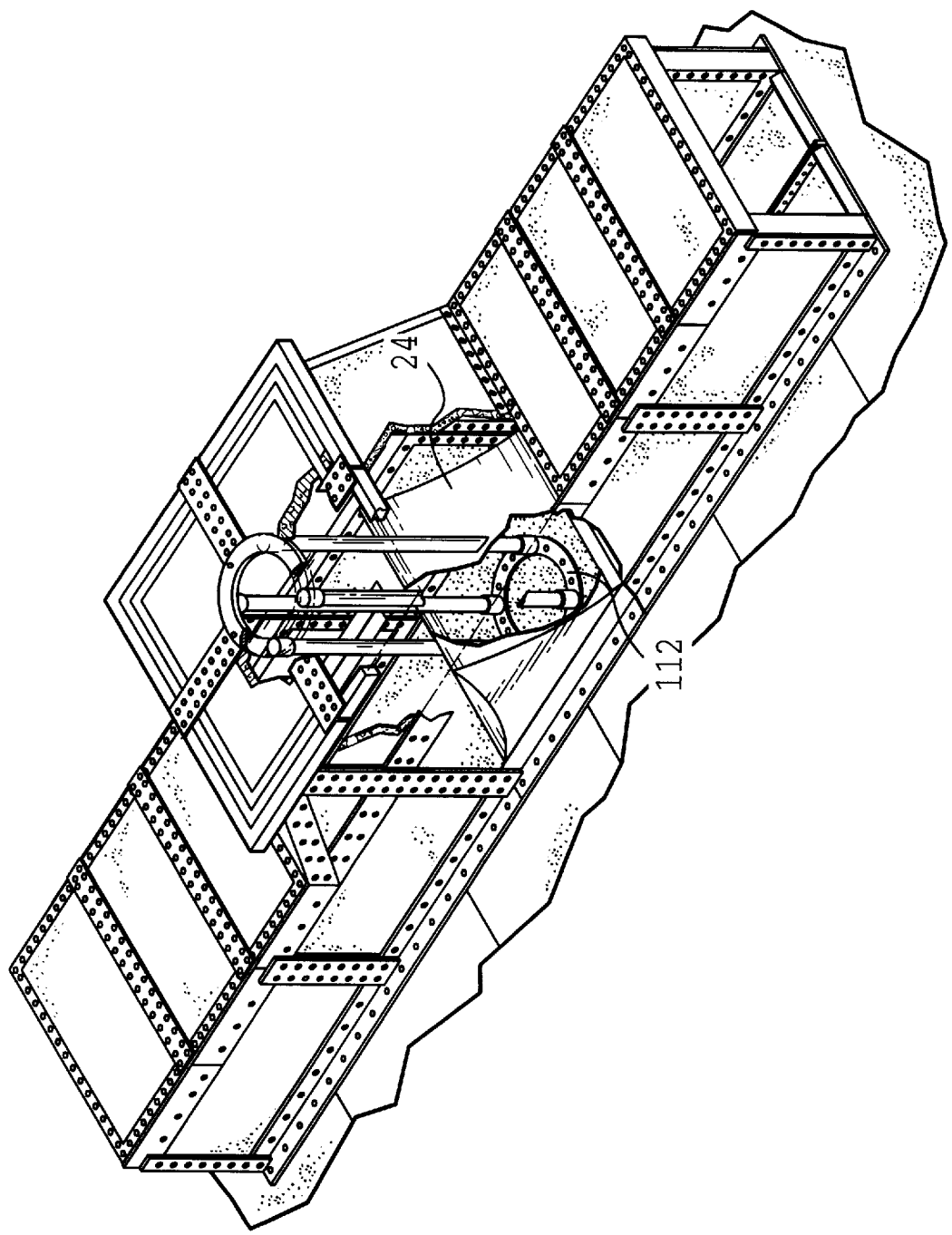
FIG. 30 is a partial cutaway isometric view of the launch pad in accordance with the invention.
Figure 31:
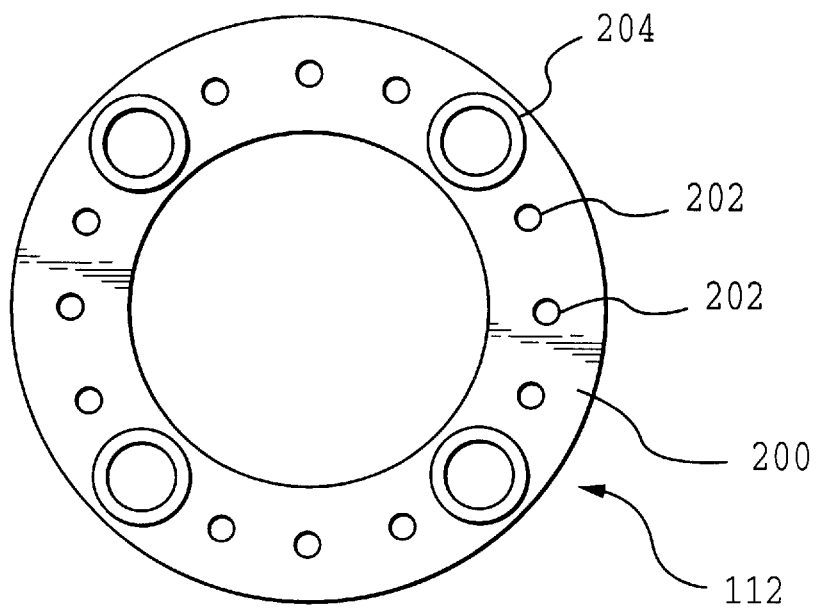
FIG. 31 is a plan view of a launch mount base ring forming part of the pad of FIG. 2.
Figure 32:
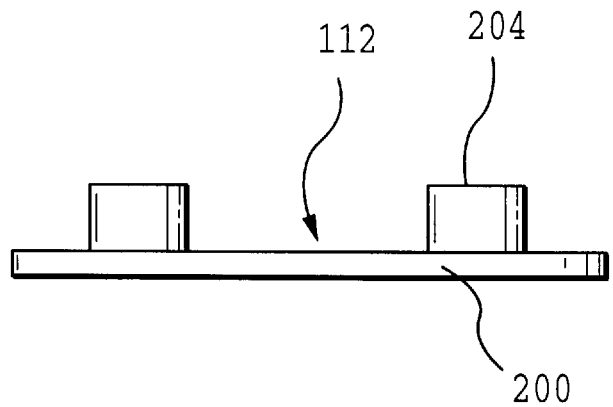
FIG. 32 is a side view of the ring of FIG. 31.
Figure 33:
FIG. 33 is an end view of a pillar forming part of a launch mount of the pad of FIG. 2.
Figure 34:
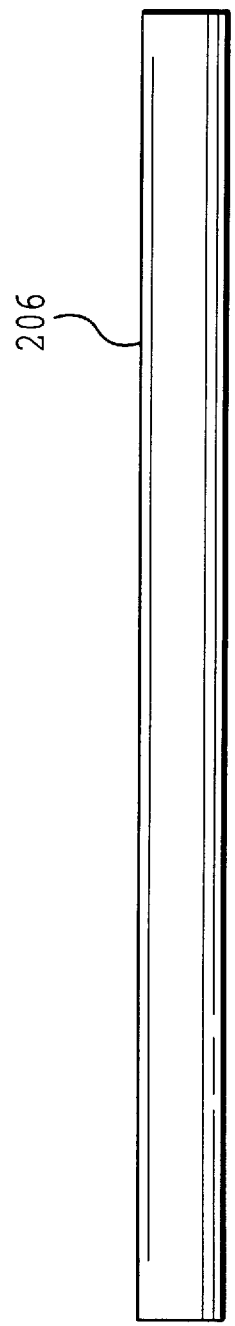
FIG. 34 is a side view of the pillar of FIG. 33.

Referring to FIG. 30, it is clear that prior to the plates 180 being secured in place, the blast deflectors 24 and the launch mount base ring 112 have to be secured in place. Referring to FIGS. 31 and 32, the base ring 112 comprises an annular structure 200 provided with 12 circumferentially extending holes 202 extending therethrough. Four cup-like formations 204 are secured to the upper surface of the annular structure 200, for example by welding. The annular structure has a thickness of four inches, an outer diameter of 96 inches and an inner diameter of 60 inches. The cup-like formations 204 are 12 inches in height, have an outer diameter of 16 inches and an inner diameter of 12 inches. The cup-like formations 204 serve to accommodate 12 inch diameter hollow pillars 206 having an inner diameter of six inches as illustrated in FIGS. 33 and 34. In this embodiment, the pillars 206 have a length of 197 inches. The pillars 206 can be inserted into the formations 204 only once the blast deflectors 24 are in place or the deflectors 24 can be placed over the pillars 206 once the pillars 206 are secured to the formations 204.

Figure 35:
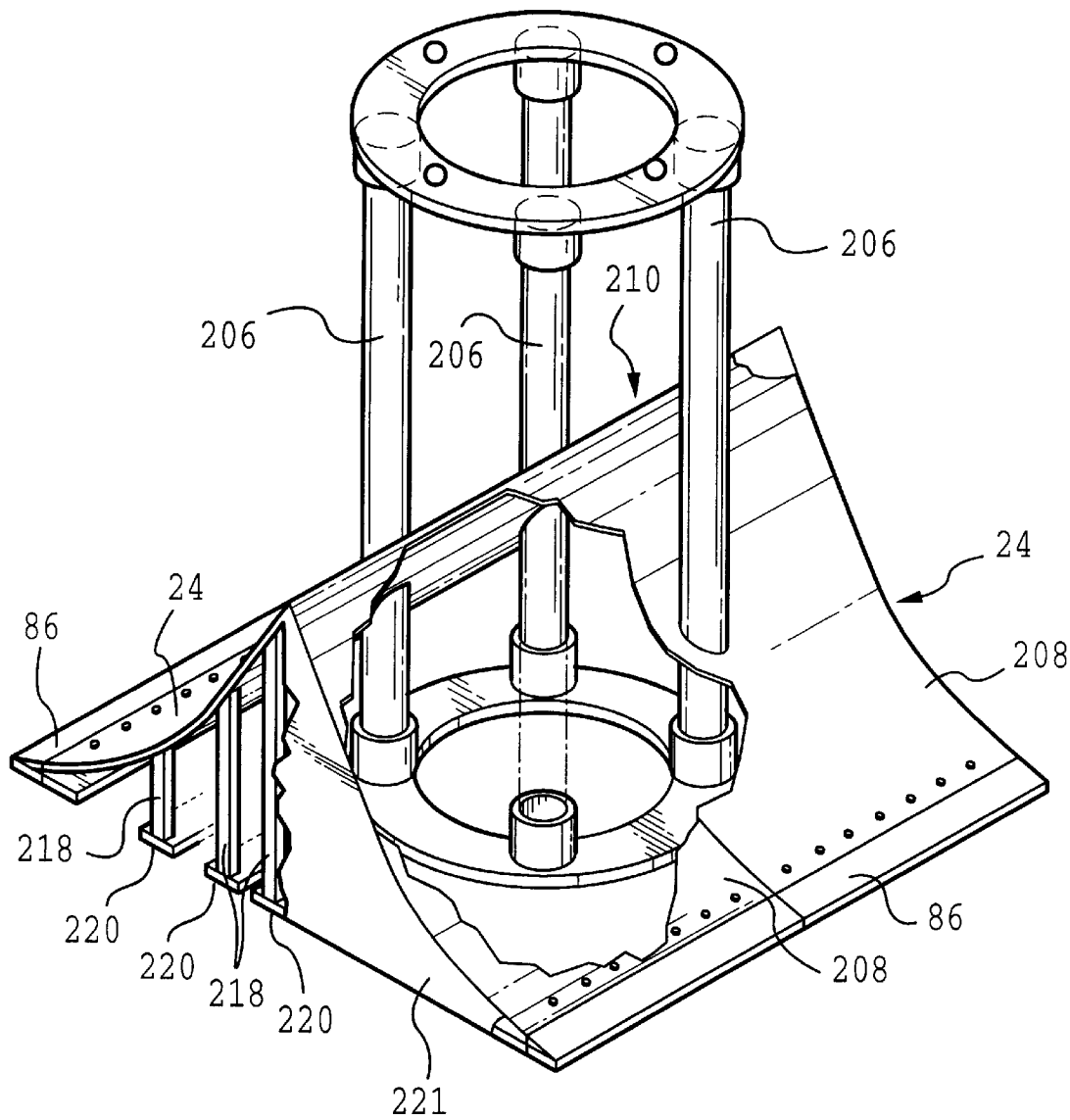
FIG. 35 is a partial cutaway isometric view of the launch mount and deflectors of the pad of FIG. 2.
Figure 36:
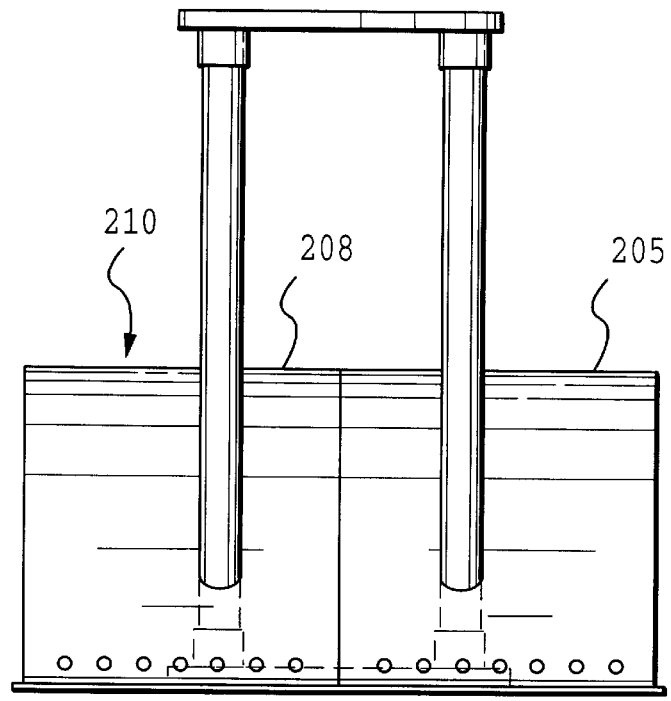
FIG. 36 is a schematic end view of the launch mount and deflectors of FIG. 35.
Figure 37:
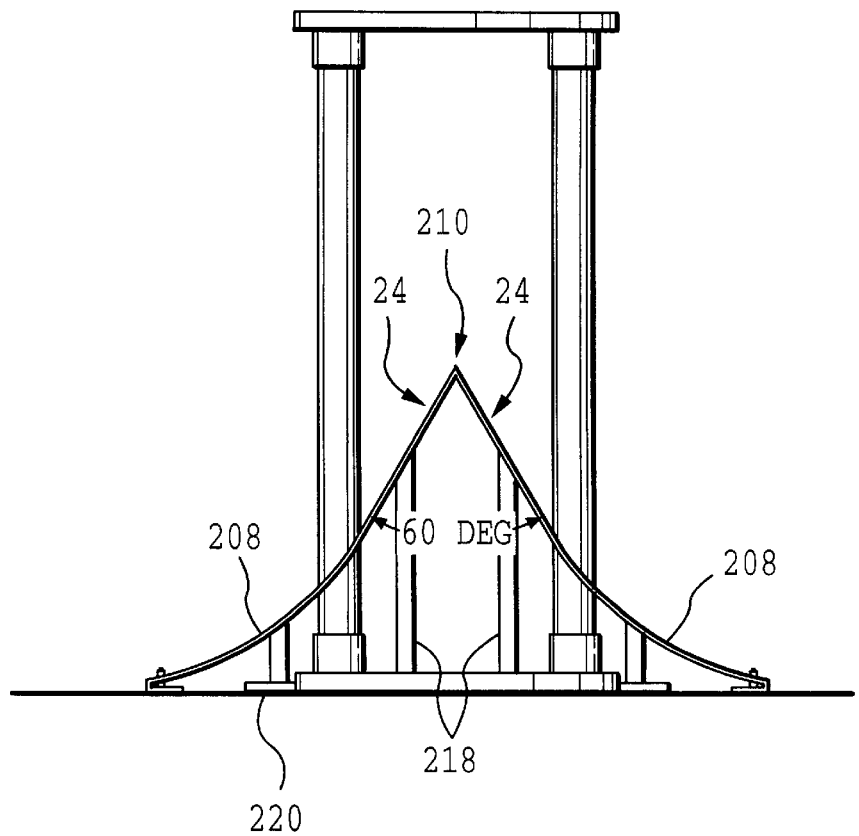
FIG. 37 is a schematic side view of the launch mount and deflectors of FIG. 35.
Figure 38:
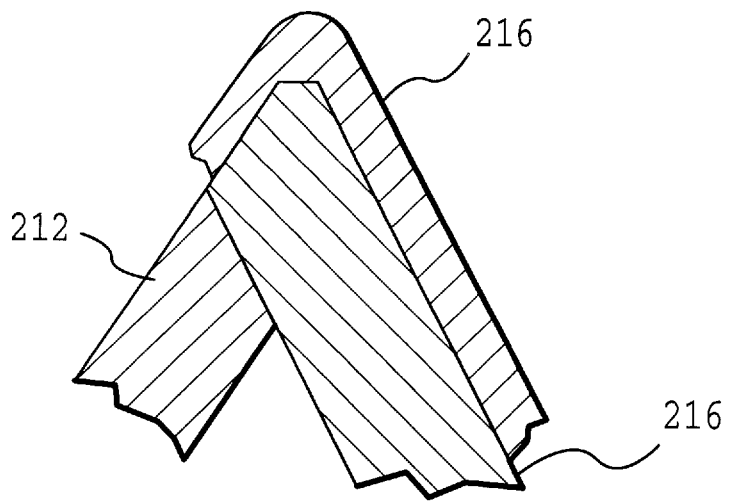
FIG. 38 is a detailed sectional side view of the vertex of a pair of deflectors in accordance with the invention.

The blast deflectors 24 are more clearly illustrated in FIGS. 35 to 37. For purposes of portability, each deflector 24 consists of two plates 208 mounted next to each other. The plates 208 can be connected to each other, for example by welding. The plates 208 are made of two inch thick steel and have a concave profile. The plates 208 of the two deflectors 24 join at their upper edges to form a vertex 210 as is shown in greater detail in FIG. 38. The one deflector 212 is slightly shorter than the other deflector 214, the edge of the deflector 212 abutting the lower surface of the deflector 214. Both deflectors are coated with a ceramic layer 216 known in the trade under the tradename MARTITE® or with a high temperature rubber compound such as those known in the trade as RTV-102 and Dynatherm 300. The plates 208 are welded to one another at the various junctions and are supported by means of props 218 mounted on bases 220. Lateral sides walls 221 can be secured to the deflectors 24 as shown in FIG. 35. This reduces pressure build up under the deflectors 24 which could cause warping and possible damage to the deflector plates 208. The walls 221 are attached using bolts received in complementary holes drilled into the side edges of the deflectors 24.

Figure 39:
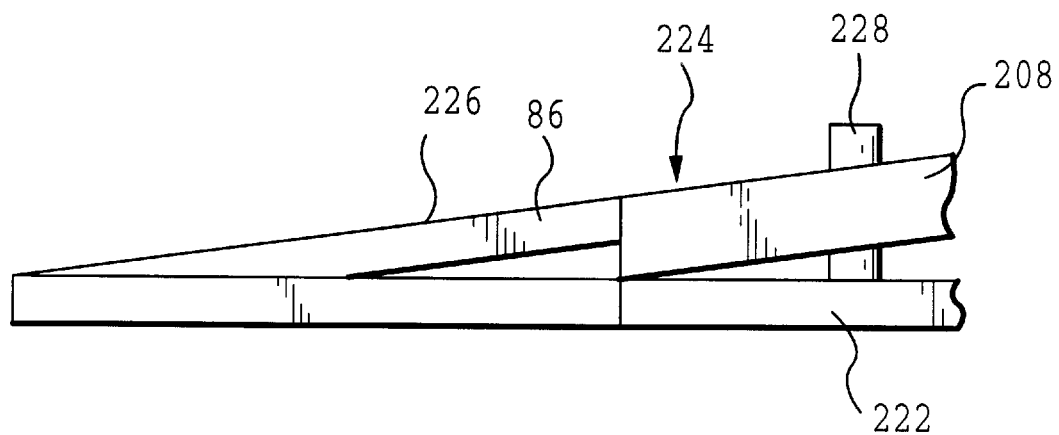
FIG. 39 is a schematic side view of the lower terminal end of one of the deflectors of FIG. 35.

As mentioned with reference to FIG. 11, the lower extremities of the deflectors 24 terminate in the form of the angle irons 86. This is best illustrated in FIG. 39 where a deflector plate 208 is shown abutting the lower extension portion 222 of the angle iron 86. The lower extension portion 222 is welded to the lower leg of the angle iron 86 and has a thickness of 1 inch and a width of 1 foot. The upper surface 224 of the plate 208 lies flush with the upper surface of the angled arm 226 of the angle iron 86. Bolts 228 pass through the plate 208 and into the lower extension portion 222 thereby securing the lower extremity of the plate 208 to the angle iron 86. The bolts 228 are typically covered with a protective coating of MARTITE® or a high temperature rubber compound such as RTV-102 or Dynatherm 300 in a manner as was described with reference to FIG. 12 for bolts 98 and nuts 104.

Figure 40:
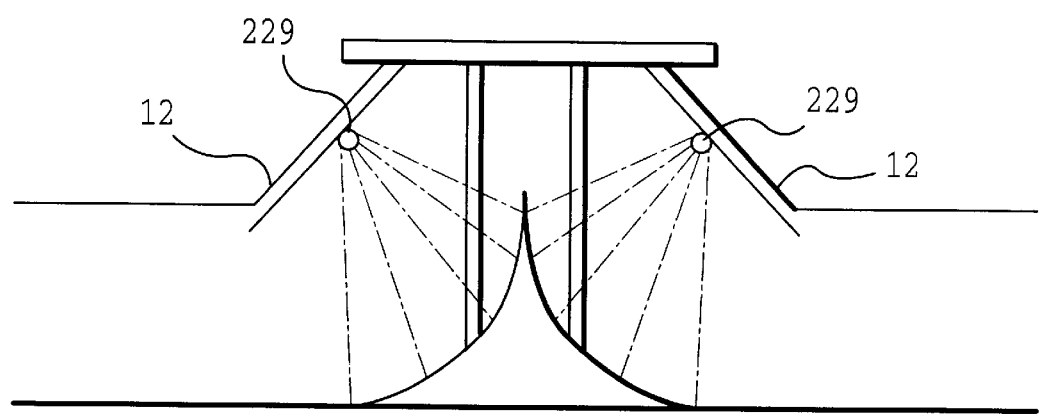
FIG. 40 is a schematic sectional side view of a launch pad showing water cooling system.

Instead of, or in addition to, coating the plates 208 with MARTITE® or a rubber compound, water may be sprayed onto the outer surfaces of the deflectors 24 during the launching of a launch vehicle as is illustrated in FIG. 40. Water is supplied from one or more fire hydrants 229 mounted on inner surfaces of the launch vehicle mounting platform 12. The fire hydrants 229 are remotely operated just prior to lift off. The water spray on the blast deflectors 24 cools the metal and prevents damage to the deflectors 24. Water spray also tends to deaden the blast lowering the sound level that reaches the booster or payload.

Figure 41:
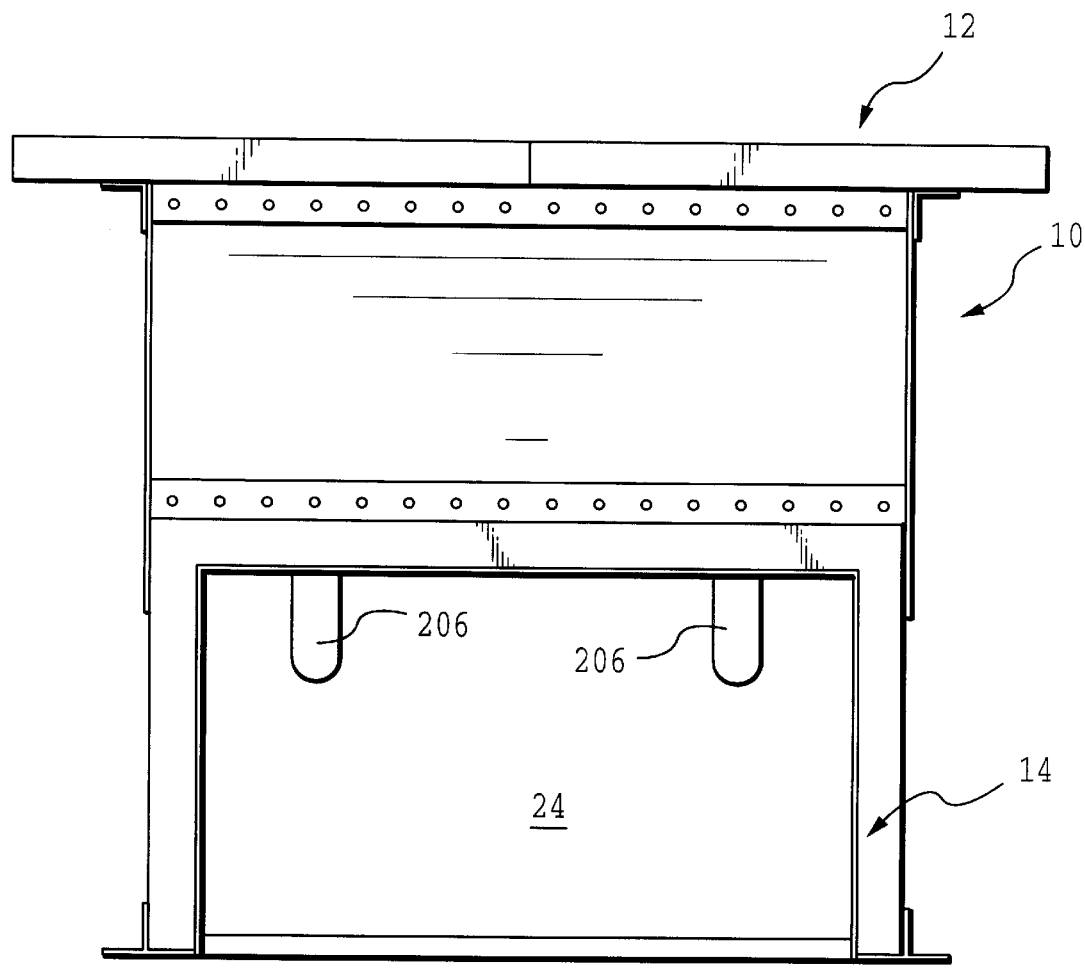
FIG. 41 is an end view of the launch pad of FIG. 2.

The plates 208 are provided with a hole each to act as a passageway for the pillars 206. Once the deflectors 24 are mounted in place, the pillars 206 are inserted into the formations 204 to protrude through the deflectors 24 as shown in FIGS. 35 to 37. FIG. 41 shows an end view of the launch pad 10 showing one of the ducts 14 and the deflector 24 and pillars 206 viewed through the duct 14. The pad 10 has a width of 16 feet between the outer surfaces of its lateral walls and a height of 17.08 feet. The mounting platform 12 has a width at the widest point of 22 feet and the duct height is 18.08 feet.

Figure 42:
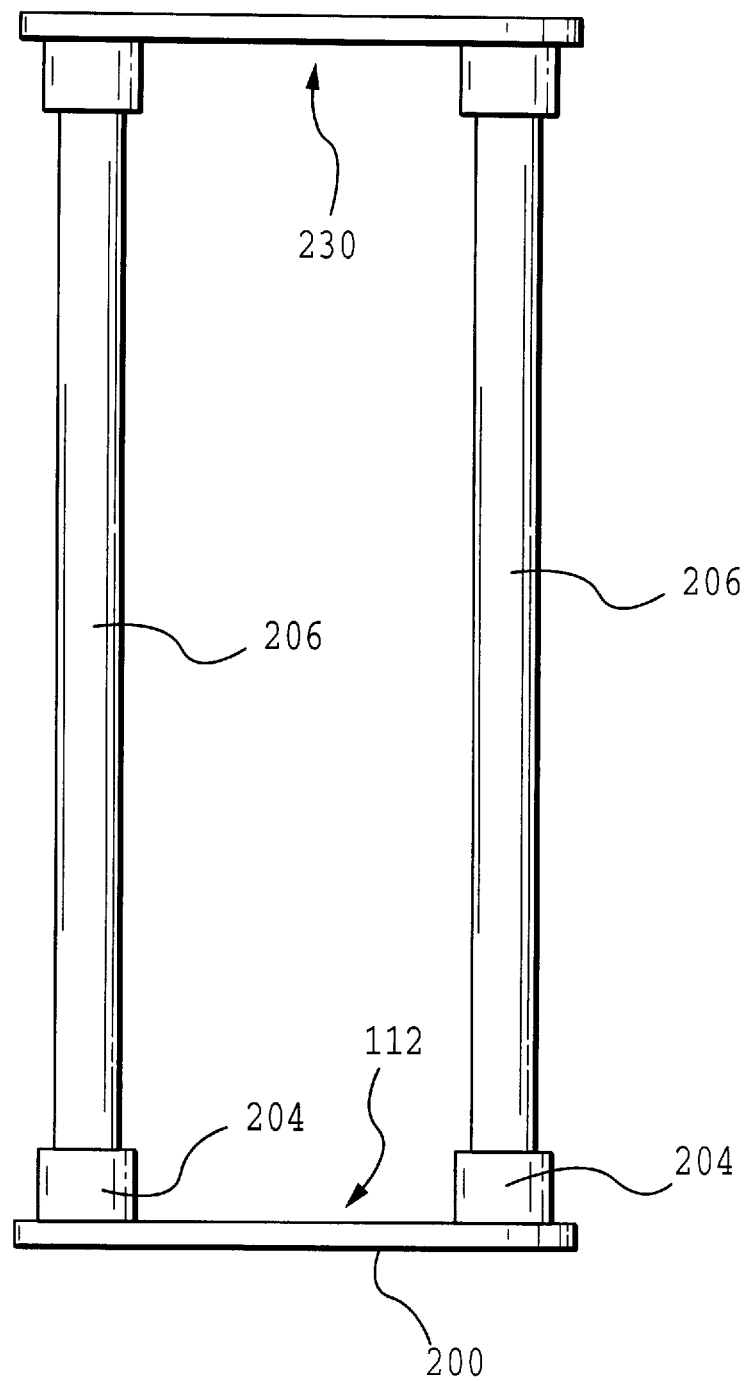
FIG. 42 is a schematic side view of the launch mount in accordance with the invention.
Figure 43:
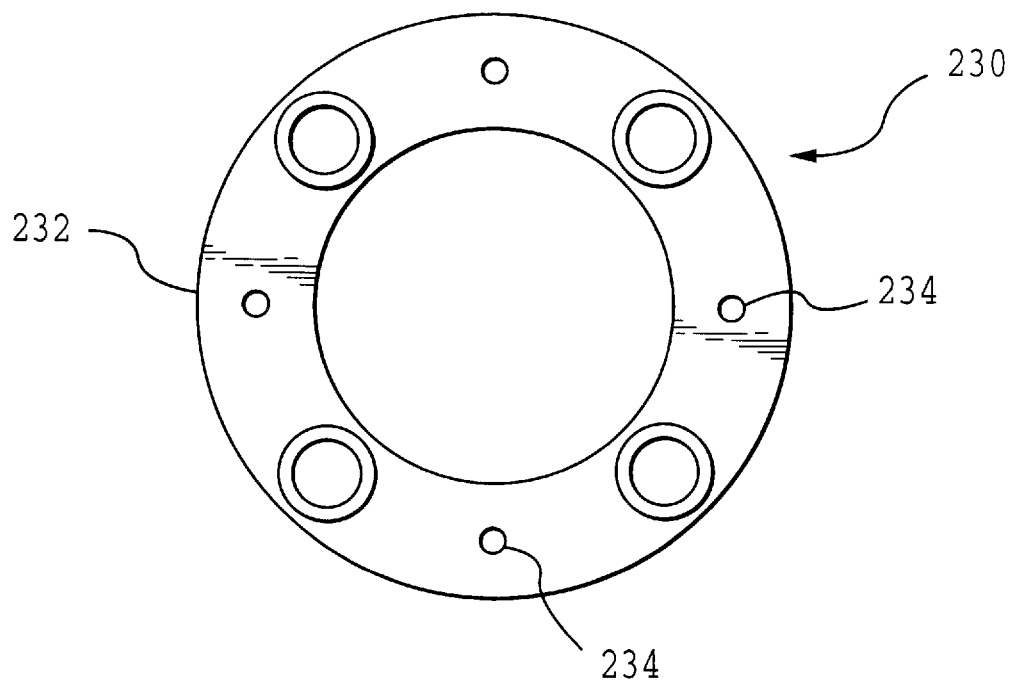
FIG. 43 is a plan view of a launch ring forming part of the launch mount of FIG. 42.
Figure 44:
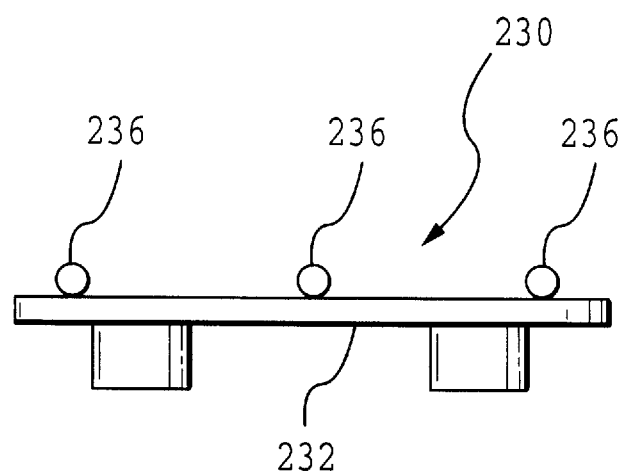
FIG. 44 is a side view of the launch ring of FIG. 43.

FIG. 42 illustrates a side view of the launch mount with its base ring 112, the pillars 206 and a launch ring 230. Referring to FIGS. 43 and 44, the launch ring 230 is similar to the base ring 112. It includes an annular structure 232 consisting of four inch thick steel and having an outer diameter of 96 inches and an inner diameter of 60 inches. Clearly no bolt holes are required in the annular formation 232, however four threaded holes 234 are provided to accommodate four alignment balls 236. The balls 236 ac provided with a threaded shaft (not shown) which is complimentarily engageable with a holes 234. The threaded shafts allow the balls 236 to be raised or lowered thus allowing the launch vehicle, which sits on the balls 236, to be levelled. This is essential for the inertial guidance system of the launch vehicle to operate properly. As is described in greater detail below, the launch vehicle can instead be mounted using explosive bolts.

Figure 45:
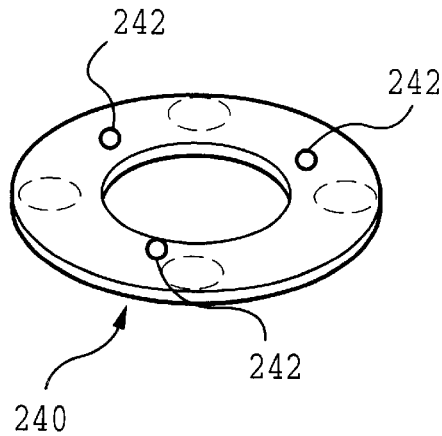
FIG. 45 is an isometric view of another embodiment of a launch ring in accordance with the invention.
Figure 46:
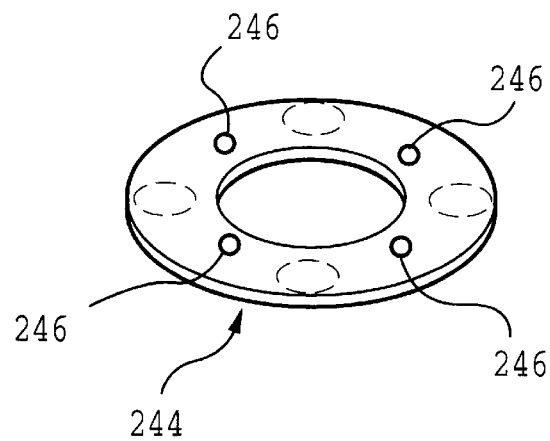
FIG. 46 is an isometric view of yet another embodiment of a launch ring in accordance with the invention.
Figure 47:
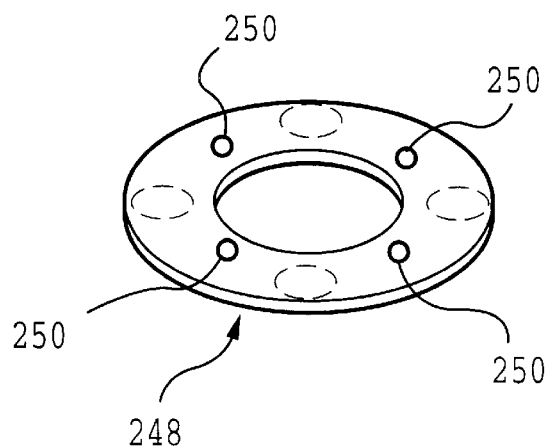
FIG. 47 is an isometric view of still another embodiment of a launch ring in accordance with the invention.

Four cup-like formations 238 are secured to the lower surface of the annular formation 232, for example by welding. The formations 238 have an outer diameter of 16 inches, an inner diameter of 12 inches and a height of 12 inches. The cup-like formations 238 are thus sized to received the pillars 206. This allows for easy replacement of the launch ring to accommodate different-sized launch vehicles. FIGS. 45 to 47 show different embodiments of the launch ring. The launch ring 240 illustrated in FIG. 45 has a 52 inch inner diameter and three alignment balls 242. The launch ring 244 of FIG. 46 has four alignment balls 246 and an inner diameter of 52 inches. The launch ring 248 illustrated in FIG. 47 has four alignment balls 250 but an inner diameter of only 48 inches.

Figure 48:
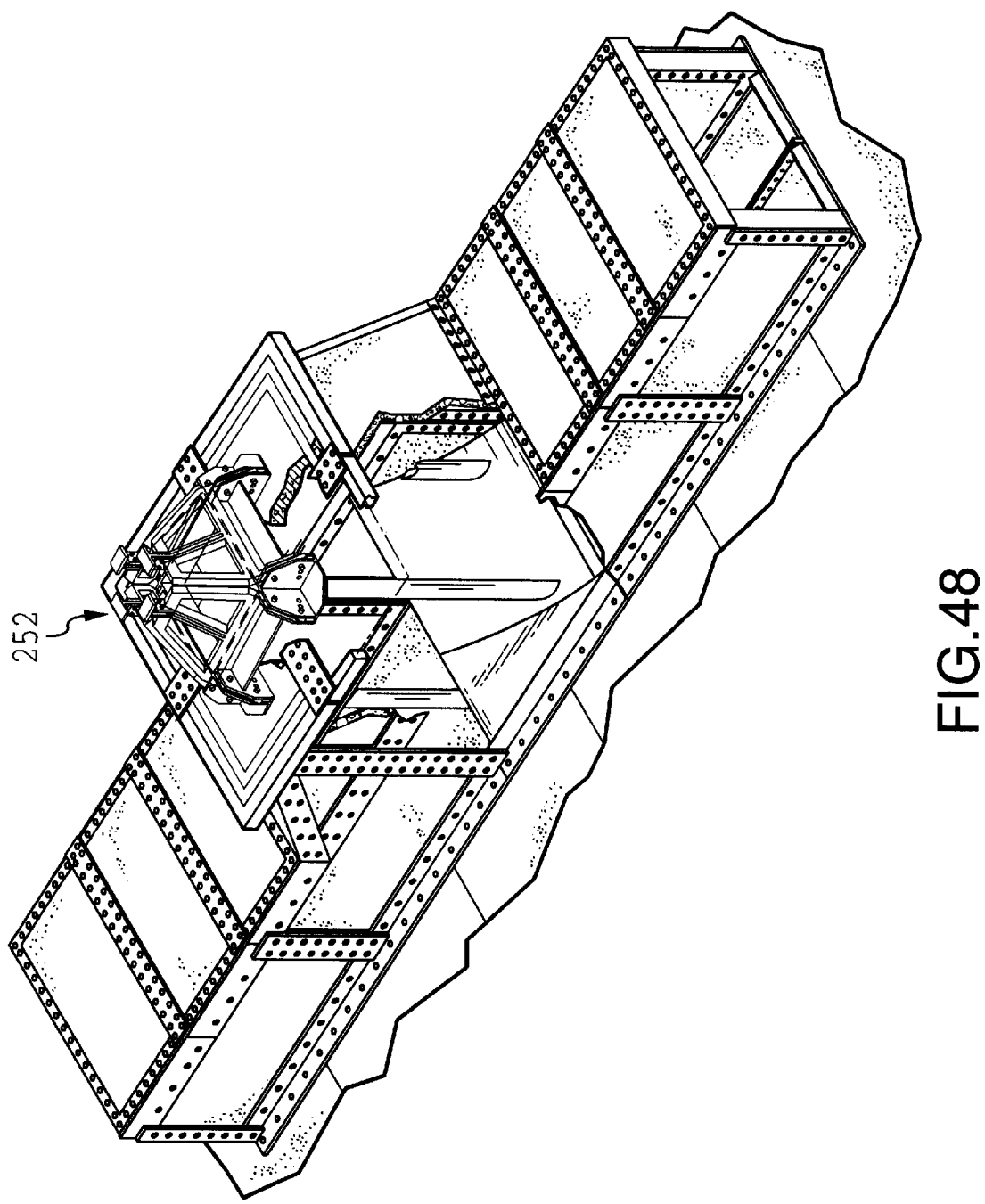
FIG. 48 is a cutaway isometric view of another embodiment of a launch pad in accordance with the invention.
Figure 49:
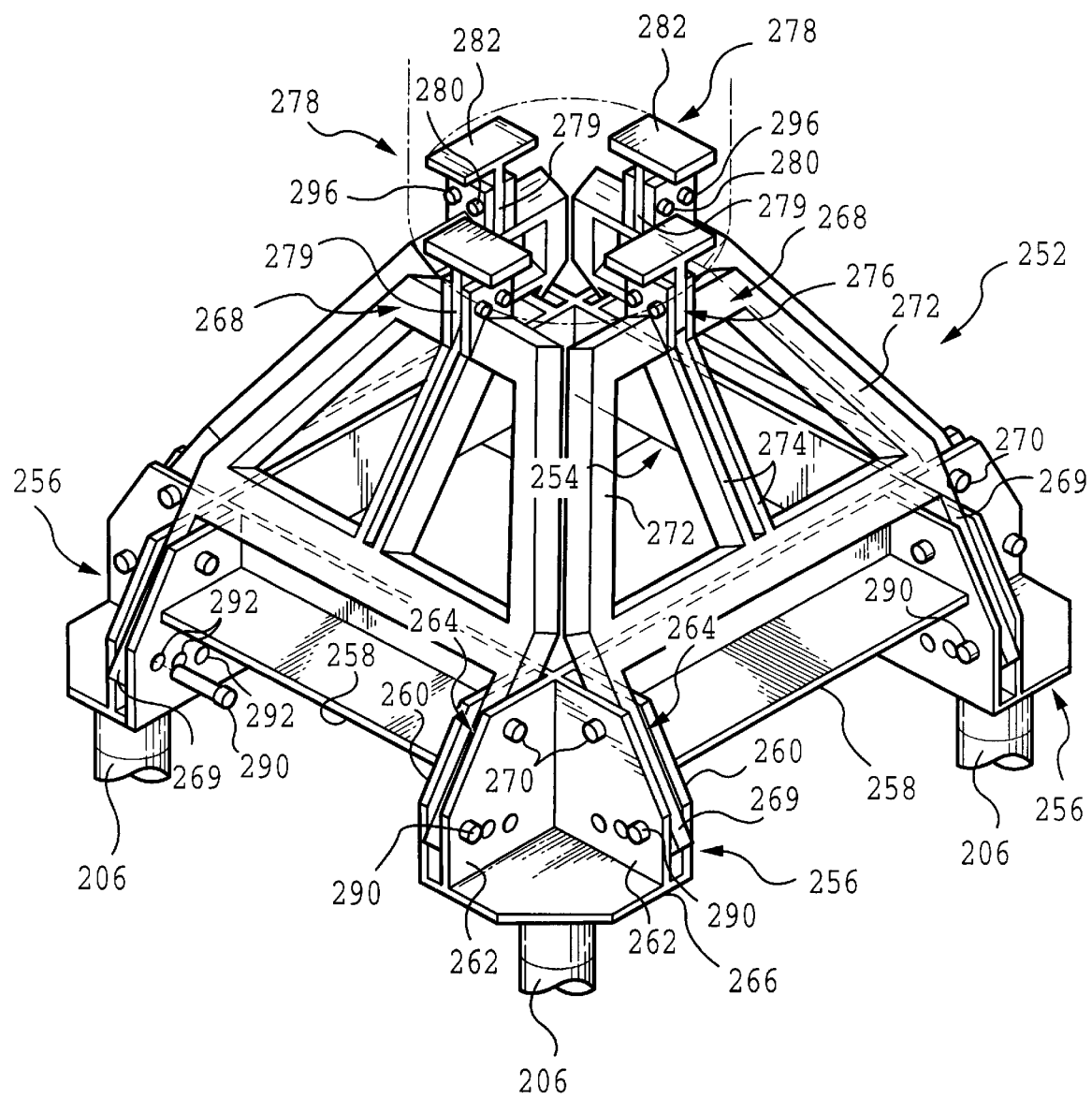
FIG. 49 is an isometric view of an adaptor forming part of the launch pad illustrated in FIG. 48.
Figure 50:
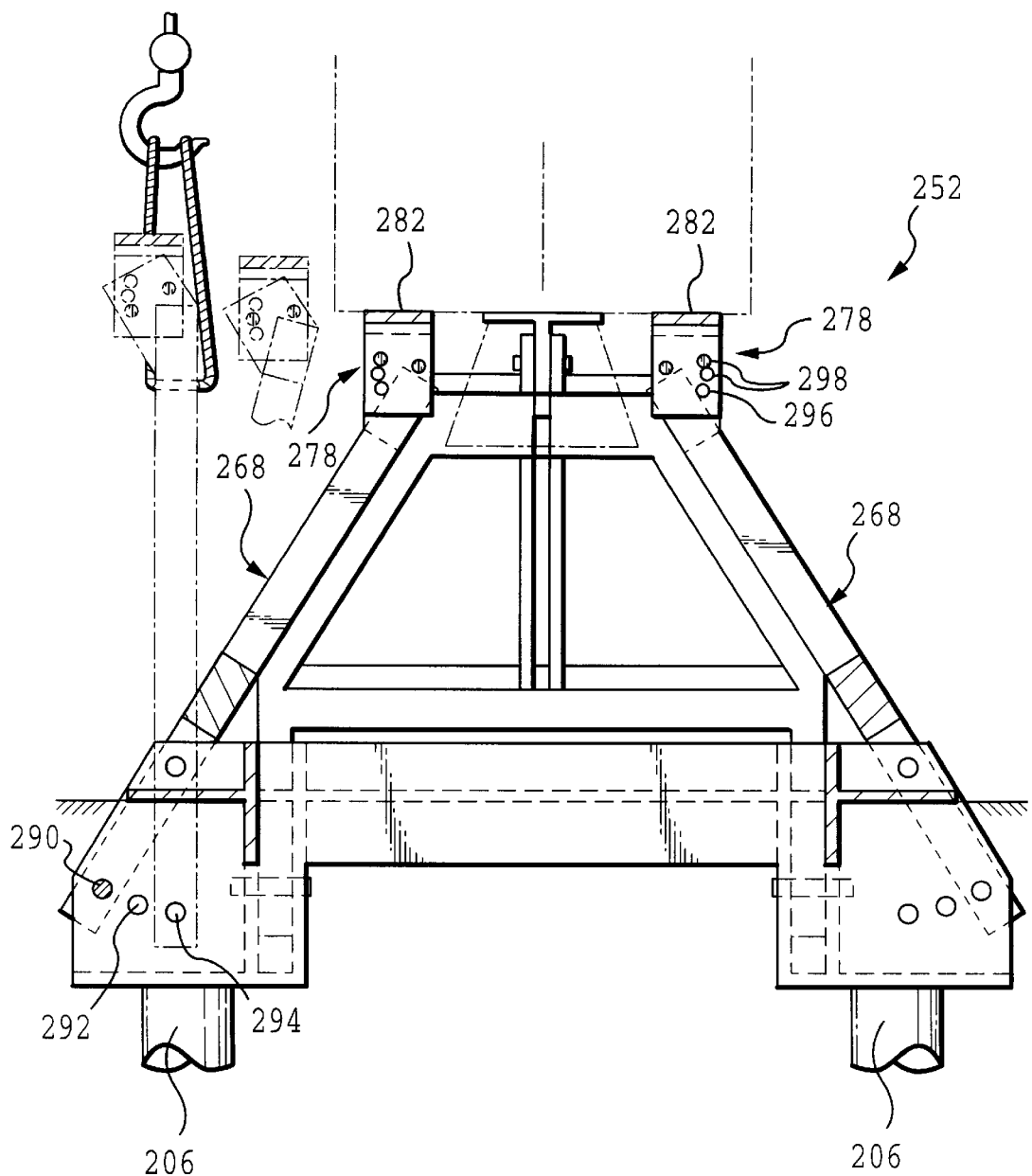
FIG. 50 is a side view of the adaptor of FIG. 49.

The versatility of the launch mount can be further enhanced by replacing the upper launch ring with an adapter 252 as illustrated in FIGS. 48 to 50. The adapter comprises a rectangular frame 254 to which are attached four feet 256. The feet 256 are stabilized by means of webs 258 extending between outer walls 260 of the feet 256. Each foot 256 includes two outer walls 260 aligned perpendicularly to one another. Spaced from the outer walls 260 are a pair of inner walls 262 thereby providing two channels 264 at right angles to one another. The walls 260, 262 are mounted on a base plate 266 which is welded onto a pillar 218. Four arms 268 are pivotally mounted in the channels 264. Each arm 268 is provided with a pair of downwardly extending bars 269 received in the channels 264 as illustrated in FIG. 49, and pivotable about pivotal axes in the form of bolts 270. Each arm 268 extends upwardly in the form of a tapered frame structure which includes a pair of outer ribs 272 and a pair of inner ribs 274. The ribs 272, 274 are joined at their upper extremities. The inner ribs 274 define a channel 276 between them. A pedestal in the form of a T-shaped support formation 278 is pivotally secured in each channel 276 by means of a downwardly extending plate 279 received in the channel 276. The pedestal 278 is pivotable about a bolt 280. The base 282 of the pedestal 278 provides a flat support surface for a launch vehicle. Referring to FIG. 50 each arm 268 is pivotable between one of three positions by virtue of retaining bolts 290 (FIG. 49) associated with the bars 269. Each bolt 290 is engageable with one of three holes 292 extending through the walls 260, 262. A hole 294 extending through the lower extremity of the bar 268 is alignable with any one of the holes 292 to receive the bolt 290. In order to keep the bases 282 horizontal irrespective of the positions of the arms 268 a corresponding adjustment of the pedestals 278 is necessary whenever the arms 268 are adjusted. The pedestals 278 are adjustable using a method similar to the one described above. For each pedestal 278 a retaining bolt 296 is passed through one of three holes 298 to engage an outer surface of the plate 279. As with all other components that are to be re-used, the pedestals 278 are coated with a heat resistant material, for example MARTITE®, RTV-102 or Dynatherm 300.

Figure 51:
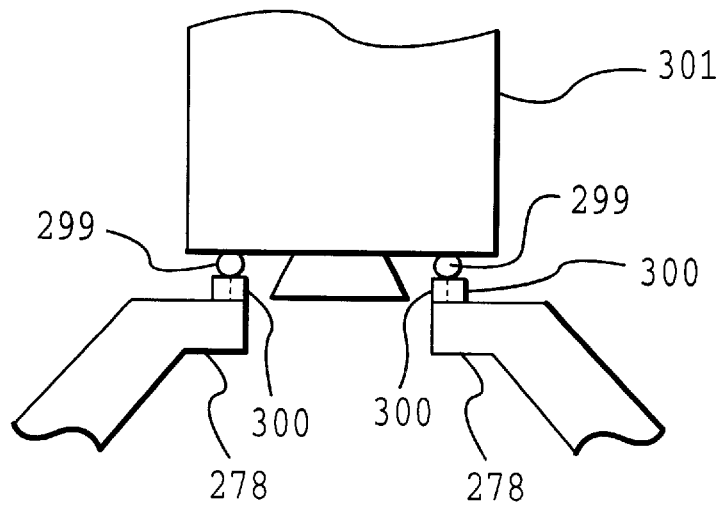
FIG. 51 is a schematic side view of an adaptor with alignment balls.
Figure 52:
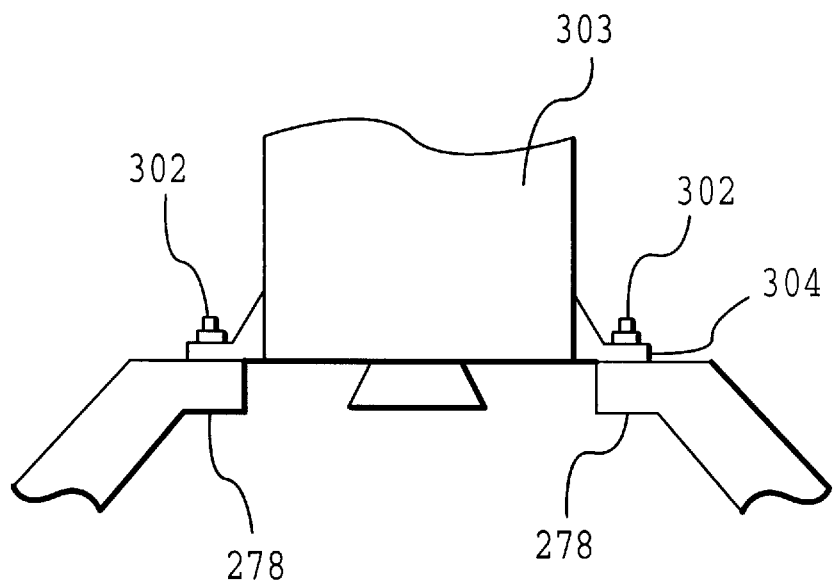
FIG. 52 is a schematic side view of an adaptor with explosive bolts.

It will be appreciated that adjustment of any of the arms 268 requires a corresponding adjustment of the other arms 268 to ensure that the heights of the bases 282 remain equal. Furthermore in this, as well as in the launch ring embodiment, the compression factor of the pillars 218 has to remain substantially constant to maintain a horizontal launch platform. As is shown in FIG. 51 the pedestals 278 may be provided with alignment balls 299 in the same way as was described above for the launch rings. The balls 299 have threaded adjustment shafts 300 received in complementary bores in the pedestals 278. This allows the launch vehicle 301 to be levelled. FIG. 52 shows another embodiment. Explosive bolts 302 secure the launch vehicle 303 to the pedestals 278. It will be appreciated that the bores in the pedestals 278 will be appropriately sized to accommodate the shafts 300 or bolts 302. The bolts 302 fire at engine start of the launch vehicle 303. Alignment and leveling of the launch vehicle 303 is accomplished by bolt adjustment and shimming the bottom of the booster using shims 304.

The launch pads 10 described thus far all included a pair of laterally extending cylindrical ducts 14. It will be appreciated that a wide variety of different launch pads can be developed using the principles discussed above. For instance, the launch pads could have one or more than two exhaust gas ducts. One embodiment is illustrated in FIG. 53 and shows a launch pad 305 having ducts 306 extending laterally outwardly and flaring outwardly in funnel-like fashion.

Figure 53:
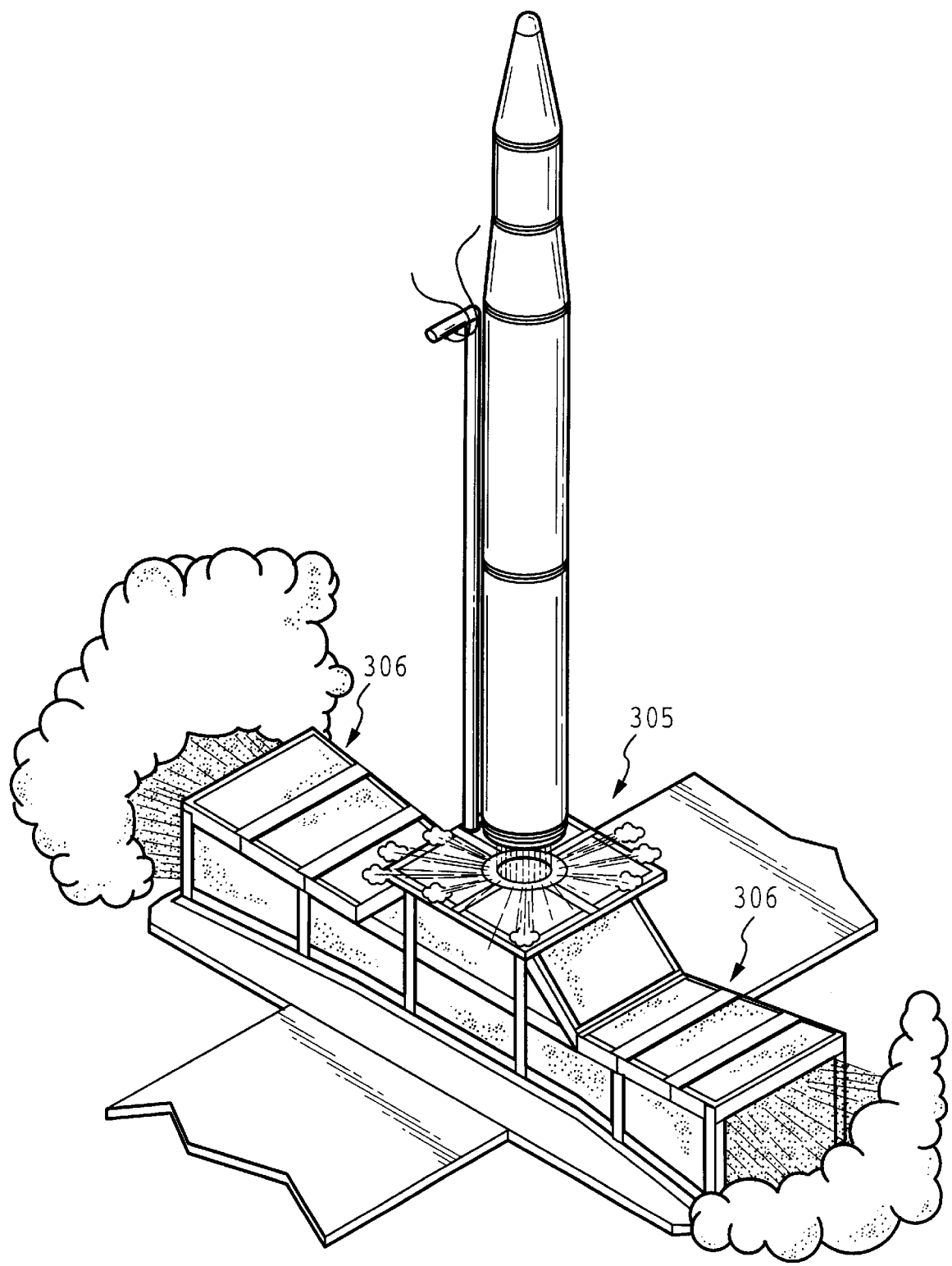
FIG. 53 is an isometric view of another embodiment of a launch pad in accordance with the invention.
Figure 54:
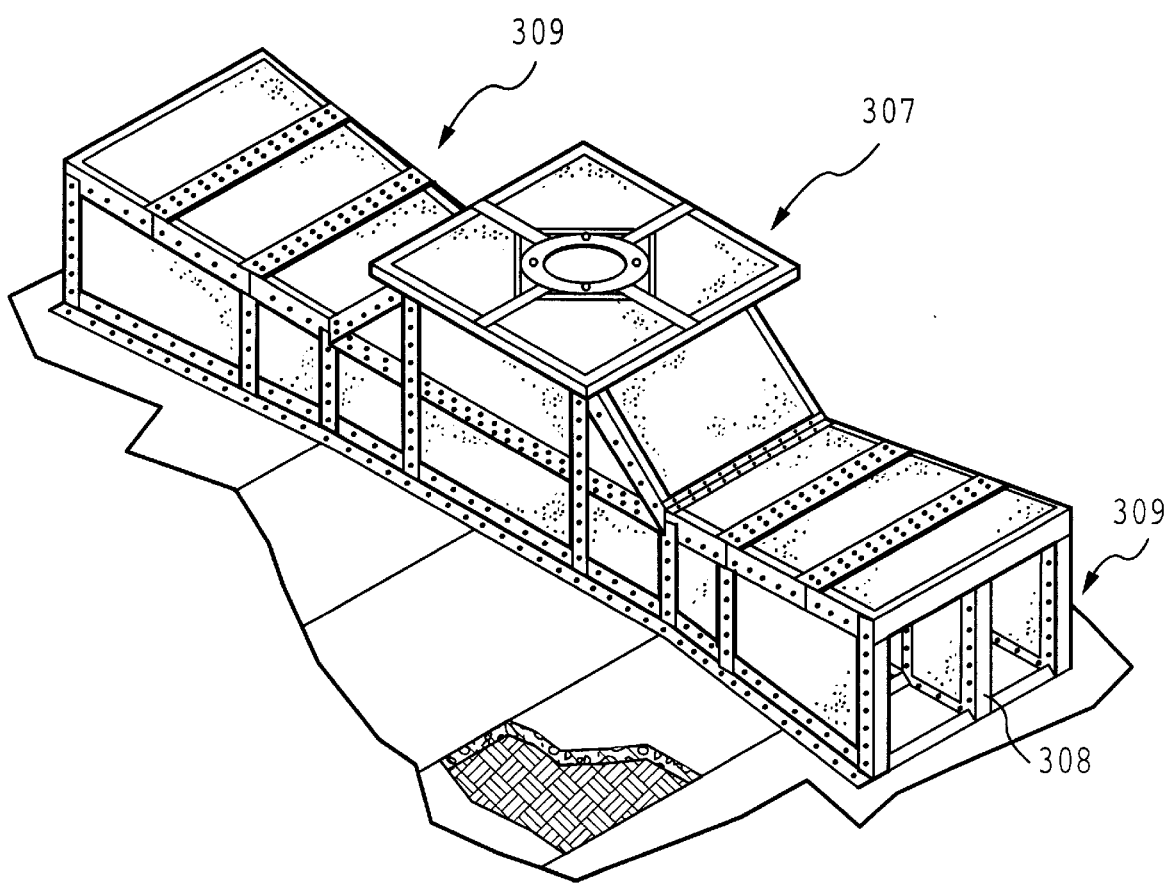
FIG. 54 is an isometric view of yet another embodiment of a launch pad in accordance with the invention.

FIG. 54 shows a similar embodiment to the one illustrated in FIG. 53 except that the launch pad 307 in this embodiment has longitudinally extending vertical walls 308 dividing each of the ducts 309 in half, thereby effectively creating a pair of ducts extending in the two directions.

Figure 55:
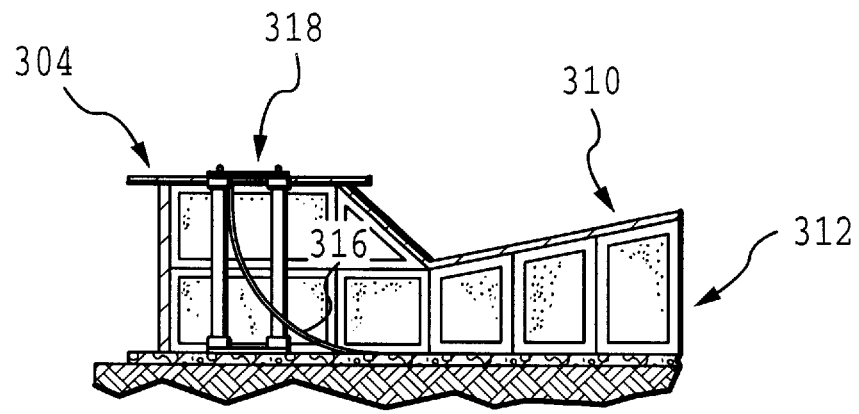
FIG. 55 is a sectional side view of still a further embodiment of a launch pad in accordance with the invention.
Figure 56:
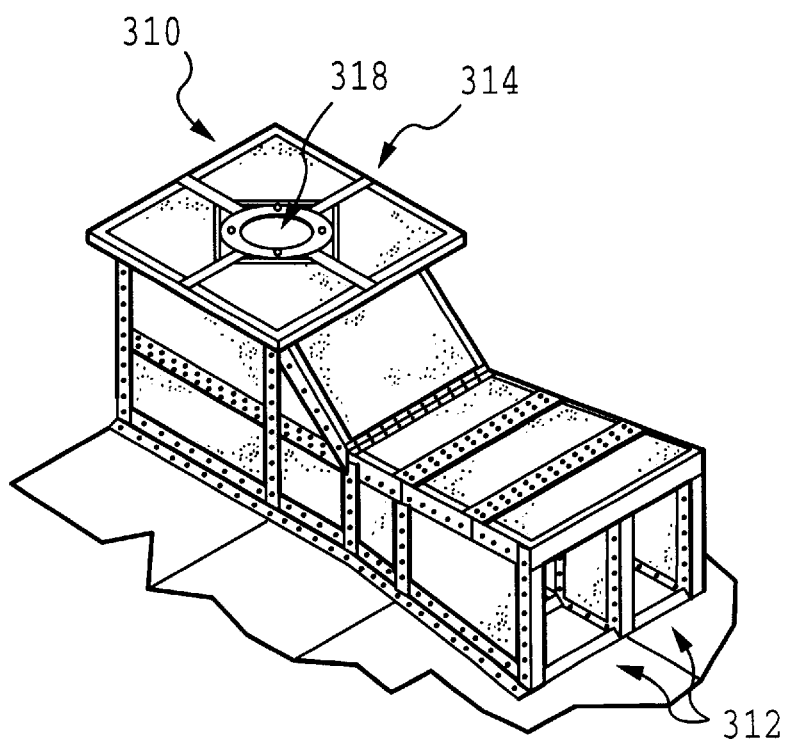
FIG. 56 is an isometric view of the launch pad of FIG. 55.
Figure 57:
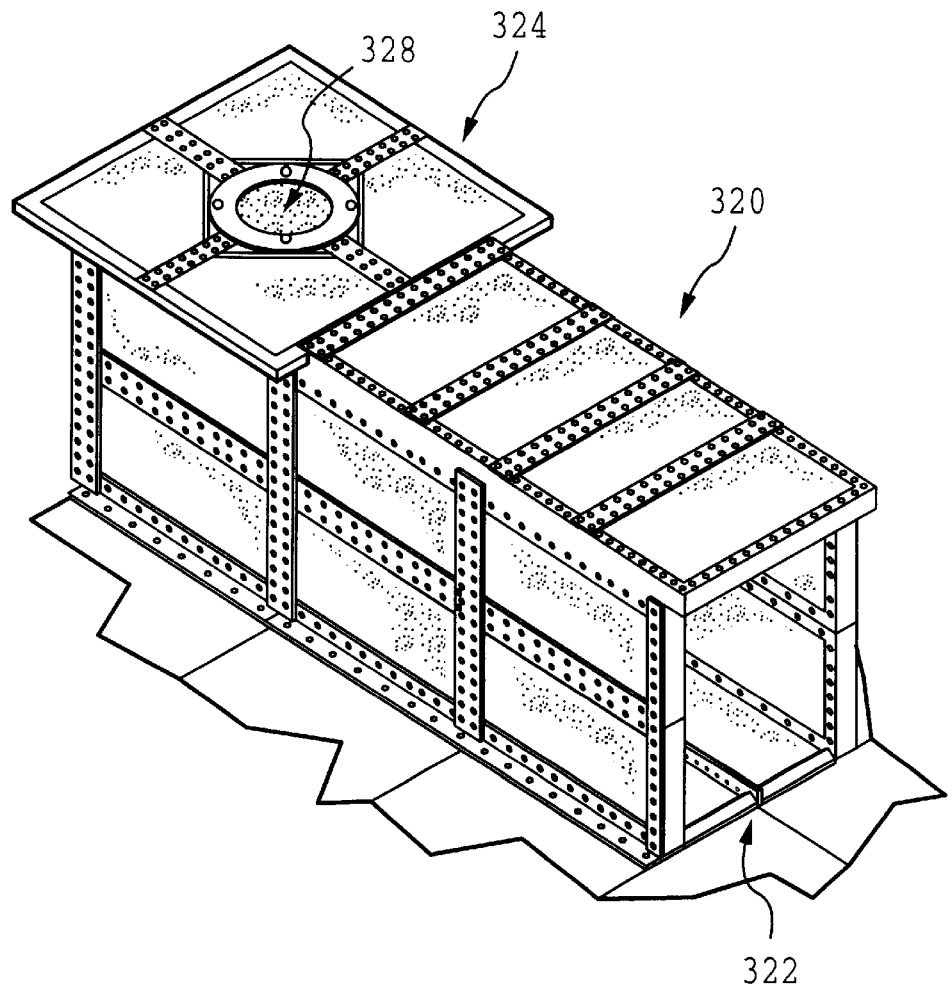
FIG. 57 is an isometric view of yet another embodiment of a launch pad in accordance with the invention.
Figure 58:
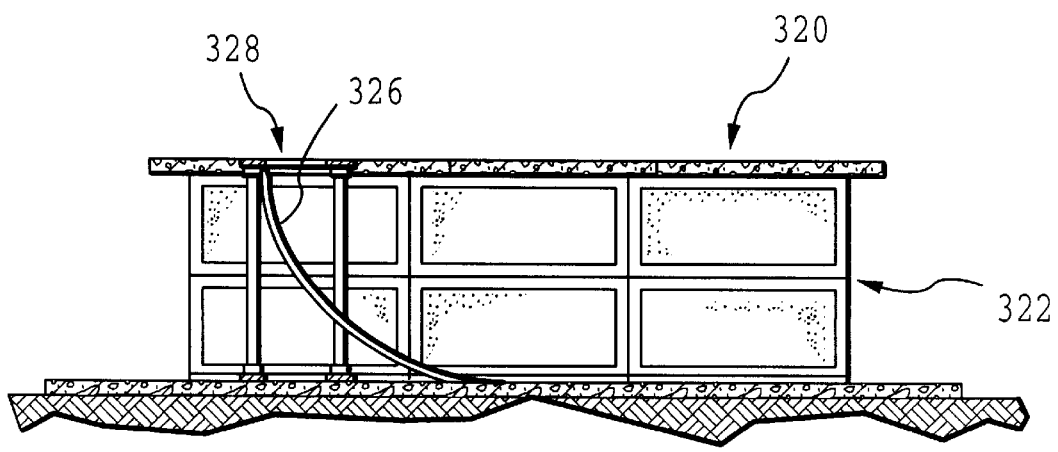
FIG. 58 is a sectional side view of the launch pad of FIG. 57.

FIGS. 55 and 56 show a launch pad 310 having a pair of flared ducts 312 extending from only one side of the mounting platform 314. Clearly in such an embodiment, where ducts extend only to one side, only a single deflector 316 is required as illustrated in FIG. 55. The deflector 316 differs from the deflector previously described insofar as the deflector extends all the way to the exhaust opening 318. A further embodiment of a launch pad having a duct extending only to one side is illustrated in FIGS. 57 and 58. The launch pad 320 of this embodiment shows a much larger duct 322 having parallel sides and a height corresponding to that of the launch vehicle mounting platform 324. Again the deflector 326 extends all the way up to the exhaust gas opening 328 as illustrated in FIG. 58.

The invention claimed is:

1. A modular launch pad for a launch vehicle, comprising:
   a launch pad frame defining a plurality of interstitial frame openings;
   a plurality of slab means, separably connected to the launch pad frame by means of slab connectors, for defining a launch pad support structure in combination with said launch pad frame, each of said slab means including a structural slab for extending across a corresponding one of said frame openings; and
   a launch vehicle mounting means having an exhaust gas opening for supporting a launch vehicle, the launch pad frame defining exhaust gas channeling means in flow communication with the exhaust gas opening with the mounting means for channeling launch exhaust gases of the launch vehicle away from the vehicle.

2. The modular launch pad of claim 1, wherein:
   each said slab comprises opposed major surfaces, and connecting means embedded in the slab complementarily engageable with the slab connectors;
   each connecting means comprises an internally threaded sleeve extending through the slab between the major surfaces of the slab wherein the ends of the sleeves lie flush with the major surfaces of the slab.

3. The modular launch pad claim 1, wherein said slab includes opposed major surfaces, and connecting means embedded in the slab complementarily engageable with the slab connectors, and a peripheral frame secured to the periphery of the slab.

4. The modular launch pad of claim 1, which includes a blast deflecting means for deflecting launch vehicle exhaust gases into the channeling means.

5. The modular launch pad of claim 4, wherein the channeling means comprises at least one laterally extending duct forming a flow path extending away from the blast deflecting means.

6. The modular launch pad of claim 5, wherein the channeling means comprises two ducts extending outwardly in opposite directions from the blast deflecting means, and wherein the blast deflecting means includes a pair of angled deflector plates, each having a ramp-like concave surface, the plates being connected along upper edges of the plates to form a vertex.

7. The modular launch pad of claim 1, wherein the launch vehicle mounting means includes a plurality of vertically extended pillars and an adapting means mounted on the pillars for supporting a launch vehicle.

8. The modular launch pad of claim 7, wherein the adapting means comprises an adapter ring removably engageable with upper ends of the pillars.

9. The modular launch pad of claim 7, wherein the adapting means comprises a plurality of pedestals having horizontal upper faces, the pedestals being movably mounted relative to one another.

10. The modular launch pad of claim 1, wherein,
each said slab includes opposed major surfaces, and connecting means embedded in the slab complementarily engageable with the slab connectors; and
each slab is made of concrete or a carbon phenolic material, with reinforcing bars comprising rebars, or bars made of spun carbon material.

11. A modular launch pad for a launch vehicle, comprising:
a launch pad frame;
a plurality of slab means separably connected to the launch pad frame by means of slab connectors;
a launch vehicle mounting means having an exhaust gas opening for supporting a launch vehicle, the launch pad frame defining exhaust gas channeling means in flow communication with the exhaust gas opening with the mounting means for channeling launch exhaust gases of the launch vehicle away from the vehicle;
each said slab comprises opposed major surfaces, and connecting means embedded in the slab complimentarily engageable with the slab connectors;
each connecting means comprises an internally threaded sleeve extending into the slab from one of the major surfaces of the slab, and
exposed openings of the sleeves are sealed with a protective plug.

12. The modular launch pad of claim 11, wherein the protective plugs are made of a ceramic material or a high temperature rubber compound.

13. A modular launch pad for a launch vehicle, comprising:
a launch pad frame;
a plurality of slab means separably connected to the launch pad frame by means of slab connectors;
a launch vehicle mounting means having an exhaust gas opening for supporting a launch vehicle, the launch pad frame defining exhaust gas channeling means in flow communication with the exhaust gas opening with the mounting means for channeling launch exhaust gases of the launch vehicle away from the vehicle;
a blast defecting means for deflecting launch vehicle exhaust gases into the channeling means, wherein, said blast defecting means comprising at least one angled deflector plate having a ramp-like concave surface; and
cooling liquid supply means and nozzles for spraying cooling liquid onto the concave surface of the at least one deflective plate.

14. A modular launch pad for a launch vehicle, comprising a launch pad frame;
a plurality of slab means separably connected to the launch pad frame by means of slab connectors;
a launch vehicle mounting means having an exhaust gas opening for supporting a launch vehicle, the launch pad frame defining exhaust gas channeling means in flow communication with the exhaust gas opening with the mounting means for channeling launch exhaust gases of the launch vehicle away from the vehicle wherein the launch vehicle mounting means includes a plurality of vertically extended pillars and an adapting means mounted on the pillars for supporting a launch vehicle, and adapting means comprising an adapter ring removably engageable with upper ends of the pillars; and a plurality of balls on threaded shafts, the shafts being secured to the adapter ring for supporting the launch vehicle, wherein the shafts engage complementary bores in the adapter ring to facilitate adjustment of the balls and shafts.

15. A modular launch pad for a launch vehicle, comprising:
a launch pad frame;
a plurality of slab means separably connected to the launch pad frame by means of slab connectors;
a launch vehicle mounting means having an exhaust gas opening for supporting a launch vehicle, the launch pad frame defining exhaust gas channeling means in flow communication with the exhaust gas opening with the mounting means for channeling launch exhaust gases of the launch vehicle away from the vehicle wherein the launch vehicle mounting means includes a plurality of vertically extended pillars and an adapting means mounted on the pillars for supporting a launch vehicle, and adapting means comprising an adapter ring removably engageable with upper ends of the pillars; and explosive bolts for securing the launch vehicle to the adapter ring.

16. A modular launch pad a launch vehicle comprising:
a launch pad frame;
a plurality of slab means separably connected to the launch pad frame by means of slab connectors;
a launch vehicle mounting means having an exhaust gas opening for supporting a launch vehicle, the launch pad frame defining exhaust gas channeling means in flow communication with the exhaust gas opening with the mounting means for channeling launch exhaust gases of the launch vehicle away from the vehicle wherein the launch vehicle mounting means includes a plurality of vertically extended pillars and an adapting means mounted on the pillars for supporting a launch vehicle, said adapting means comprising a plurality of pedestals having horizontal upper faces, the pedestals being moveably mounted relative to one another; and a plurality of balls on threaded shafts, the shaft being secured to the pedestals for supporting the launch vehicle, wherein the shafts engage complimentary bores in the pedestals to facilitate adjustment of the balls and shafts.

17. A modular launch pad for a launch vehicle, comprising:
a launch pad frame;
a plurality of slab means separably connected to the launch pad frame by means of slab connectors;
a launch vehicle mounting means having an exhaust gas opening for supporting a launch vehicle, the launch pad frame defining exhaust gas channeling means in flow communication with the exhaust gas opening with the mounting means for channeling launch exhaust gases of the launch vehicle away from the vehicle wherein the launch vehicle mounting means includes a plurality of vertically extended pillars and an adapting means mounted on the pillars for supporting a launch vehicle, said adapting means comprising a plurality of pedestals having horizontal upper faces, the pedestals being moveably mounted relative to one another; and explosive bolts for securing the launch vehicle to the pedestals.

* * * * *